United States Patent
Taylor

(10) Patent No.: US 8,332,742 B2
(45) Date of Patent: Dec. 11, 2012

(54) METHOD, SYSTEM AND COMPUTER PROGRAM PRODUCT FOR PROVIDING DIGITAL CONTENT

(75) Inventor: Billy P. Taylor, Cedar Park, TX (US)

(73) Assignee: Libredigital, Inc., Austin, TX (US)

( * ) Notice: Subject to any disclaimer, the term of this patent is extended or adjusted under 35 U.S.C. 154(b) by 166 days.

(21) Appl. No.: 12/790,429

(22) Filed: May 28, 2010

(65) Prior Publication Data

US 2010/0241942 A1    Sep. 23, 2010

Related U.S. Application Data

(63) Continuation of application No. 09/690,366, filed on Oct. 16, 2000, now Pat. No. 7,900,130.

(60) Provisional application No. 60/208,015, filed on May 26, 2000.

(51) Int. Cl.
*G06F 17/00* (2006.01)
(52) U.S. Cl. ......... 715/208; 715/209; 715/229; 715/230
(58) Field of Classification Search .................. 715/208, 715/209, 229, 230
See application file for complete search history.

(56) References Cited

U.S. PATENT DOCUMENTS

| | | |
|---|---|---|
| 5,341,466 A | 8/1994 | Perlin et al. |
| 5,491,785 A | 2/1996 | Robson et al. |
| 5,511,160 A | 4/1996 | Robson |
| 5,630,103 A | 5/1997 | Smith et al. |
| 5,634,064 A | 5/1997 | Warnock et al. |
| 5,689,648 A | 11/1997 | Diaz et al. |
| 5,694,594 A | 12/1997 | Chang |
| 5,708,825 A | 1/1998 | Sotomayor |
| 5,748,931 A | 5/1998 | Jones et al. |
| 5,754,938 A | 5/1998 | Herz et al. |
| 5,761,662 A | 6/1998 | Dasan |
| 5,761,681 A | 6/1998 | Huffman et al. |
| 5,794,210 A | 8/1998 | Goldhaber et al. |
| 5,819,259 A | 10/1998 | Duke-Moran et al. |
| 5,845,262 A | 12/1998 | Nozue et al. |
| 5,845,299 A | 12/1998 | Arora et al. |
| 5,860,073 A | 1/1999 | Ferrel et al. |
| 5,893,132 A | 4/1999 | Huffman et al. |
| 5,937,418 A | 8/1999 | Ferris et al. |
| 5,970,231 A | 10/1999 | Crandall |

(Continued)

FOREIGN PATENT DOCUMENTS

| | | |
|---|---|---|
| EP | 0798653 A2 | 1/1997 |
| EP | 0921481 A2 | 6/1999 |
| GB | 2329988 A | 4/1999 |
| WO | WO 99/023584 | 5/1999 |
| WO | WO 99/60458 A2 | 11/1999 |
| WO | WO 00/20945 A2 | 4/2000 |
| WO | WO 00/30002 A1 | 5/2000 |

OTHER PUBLICATIONS

Office Action issued in U.S. Appl. No. 09/690,368, mailed Aug. 20, 2010, 9 pgs.

(Continued)

*Primary Examiner* — Stephen Hong
*Assistant Examiner* — Matthew Ludwig
(74) *Attorney, Agent, or Firm* — Sprinkle IP Law Group

(57) ABSTRACT

A method performed by a computer system. The method includes storing a version of a mass-produced printed paper, identifying at least a subset of characters within the version, and in response to the identified subset, forming at least one hyperlink within the version, the version being displayable on a display device as a likeness of the paper including an indicator of a hyperlink.

33 Claims, 27 Drawing Sheets

U.S. PATENT DOCUMENTS

| | | | |
|---|---|---|---|
| 6,029,182 | A | 2/2000 | Nehab et al. |
| 6,035,330 | A | 3/2000 | Astiz et al. |
| 6,073,105 | A | 6/2000 | Sutcliffe et al. |
| 6,081,262 | A | 6/2000 | Gill et al. |
| 6,122,647 | A | 9/2000 | Horowitz et al. |
| 6,161,127 | A | 12/2000 | Cezar et al. |
| 6,182,050 | B1 | 1/2001 | Ballard |
| 6,253,188 | B1 | 6/2001 | Witek et al. |
| 6,263,121 | B1 | 7/2001 | Melen et al. |
| 6,356,922 | B1 * | 3/2002 | Schilit et al. ............. 715/236 |
| 6,370,535 | B1 | 4/2002 | Shapiro et al. |
| 6,389,435 | B1 | 5/2002 | Golovchinsky et al. |
| 6,389,541 | B1 | 5/2002 | Patterson |
| 6,401,075 | B1 | 6/2002 | Mason et al. |
| 6,414,677 | B1 | 7/2002 | Robertson et al. |
| 6,437,758 | B1 | 8/2002 | Nielsen et al. |
| 6,438,588 | B1 | 8/2002 | Crandall |
| 6,460,036 | B1 | 10/2002 | Herz |
| 6,484,198 | B1 | 11/2002 | Milovanovic et al. |
| 6,486,895 | B1 | 11/2002 | Robertson et al. |
| 6,563,913 | B1 | 5/2003 | Kaghazian |
| 6,573,916 | B1 | 6/2003 | Grossweiler et al. |
| 6,582,475 | B2 | 6/2003 | Graham et al. |
| 6,584,480 | B1 | 6/2003 | Ferrel et al. |
| 6,625,581 | B1 | 9/2003 | Perkowski |
| 6,643,663 | B1 | 11/2003 | Dabney et al. |
| 6,678,866 | B1 | 1/2004 | Sugimoto et al. |
| 6,694,484 | B1 | 2/2004 | Mueller |
| 6,697,997 | B1 | 2/2004 | Fujimura |
| 6,701,301 | B2 | 3/2004 | Seet |
| 6,738,841 | B1 | 5/2004 | Wolff |
| 6,760,916 | B2 | 7/2004 | Holtz et al. |
| 6,763,496 | B1 | 7/2004 | Hennings et al. |
| 6,766,362 | B1 | 7/2004 | Miyasaka et al. |
| 6,769,096 | B1 | 7/2004 | Kuppusamy et al. |
| 6,807,558 | B1 | 10/2004 | Hassett et al. |
| 6,810,136 | B2 | 10/2004 | Stern et al. |
| 6,845,273 | B1 | 1/2005 | Taylor |
| 6,850,260 | B1 | 2/2005 | Taylor |
| 6,964,374 | B1 | 11/2005 | Djuknic et al. |
| 6,981,217 | B1 | 12/2005 | Knauft et al. |
| 6,992,687 | B1 | 1/2006 | Baird et al. |
| 7,003,719 | B1 | 2/2006 | Rosenoff et al. |
| 7,007,034 | B1 | 2/2006 | Hartman et al. |
| 7,171,630 | B2 | 1/2007 | O'Leary et al. |
| 7,181,679 | B1 | 2/2007 | Taylor |
| 7,290,285 | B2 | 10/2007 | McCurdy et al. |
| 7,418,653 | B1 | 8/2008 | Stern et al. |
| 7,447,771 | B1 | 11/2008 | Taylor et al. |
| 7,600,183 | B2 | 10/2009 | Stern et al. |
| 7,900,130 | B1 | 3/2011 | Taylor |
| 8,055,994 | B1 | 11/2011 | Jones et al. |
| 2002/0035697 | A1 | 3/2002 | McCurdy et al. |
| 2002/0040374 | A1 | 4/2002 | Kent |
| 2002/0188635 | A1 | 12/2002 | Larson |
| 2003/0200507 | A1 | 10/2003 | Stern et al. |
| 2004/0162842 | A1 | 8/2004 | Ono et al. |
| 2006/0176521 | A1 | 8/2006 | Stern et al. |
| 2006/0184525 | A1 | 8/2006 | Jones et al. |
| 2008/0082903 | A1 | 4/2008 | McCurdy |
| 2010/0223151 | A1 | 9/2010 | Kon et al. |
| 2010/0241941 | A1 | 9/2010 | Taylor |
| 2011/0041050 | A1 | 2/2011 | Taylor |
| 2011/0041051 | A1 | 2/2011 | Taylor |
| 2011/0112902 | A1 | 5/2011 | Taylor |

OTHER PUBLICATIONS

Examination Report issued in German Patent Application No. 10196230.4-53, dated Aug. 24, 2010 (with English Translation), 17 pgs.

Hsu L.H., Li, P., Dawidowsky, T.: "A multimedia authoring-in-the-large environment to support complex product documentation" in: Multimedia Tools and Applications, vol. 8, No. 1, pp. 11-64, 1999. On the Internet: http://www.springerlink.com/content/u746kn34812p277w/flltext.pdf, DOI: http://www.doi.orgII0.1023/A:1009643213925. searched on: Aug. 13, 2010.

Notice of Allowance issued in U.S. Appl. No. 09/690,366, mailed Sep. 16, 2010, 4 pgs.

Office Action for U.S. Appl. No. 09/690,368, mailed Jan. 19, 2011, 7 pgs.

Office Action for U.S. Patent Application No. 11/386,351, mailed Mar. 15, 2011, 10 pgs.

Office Action for U.S. Appl. No. 11/386,351, mailed Sep. 16, 2011, 10 pgs.

Office Action issued in U.S. Appl. No. 11/386,351, mailed Jul. 21, 2010, 7 pgs.

Bates, Mary Ellen, "Dow Jones Interactive, online business information services," published Sep. 1, 1998, 9 pgs. (at http://www.highbeam.com) printed Jul. 14, 2010.

Dugan, Laura Olsen, "Online Business Intelligence Solutions: Dow Jones Interactive and Insite 2," May 1, 1999, 10 pgs (at http://llrx.com (Law Library Resource Xchange)).

Office Action issued in U.S. Appl. No. 09/690,368, mailed Jul. 26, 2005, 11 pgs.

Office Action issued in U.S. Appl. No. 09/690,199, mailed Oct. 19, 2005, 5 pgs.

Office Action issued in U.S. Appl. No. 09/690,367, mailed Nov. 29, 2005, 10 pgs.

Office Action issued in U.S. Appl. No. 09/690,368, mailed Jan. 12, 2006, 11 pgs.

Office Action issued in U.S. Appl. No. 09/690,366, mailed Jan. 17, 2006, 8 pgs.

Office Action issued in U.S. Appl. No. 09/690,367, mailed Apr. 6, 2006, 8 pgs.

Office Action issued in U.S. Appl. No. 09/690,199, mailed May 22, 2006, 8 pgs.

Office Action issued in U.S. Appl. No. 09/690,368, mailed Jul. 3, 2006, 12 pgs.

Office Action issued in U.S. Appl. No. 09/690,366, mailed Jul. 17, 2006, 14 pgs.

Office Action issued in U.S. Appl. No. 11/386,351, mailed Jul. 17, 2006, 6 pgs.

Office Action issued in U.S. Appl. No. 09/690,199, mailed Oct. 19, 2006, 7 pgs.

Office Action issued in U.S. Appl. No. 09/690,366, mailed Jan. 11, 2007, 15 pgs.

Office Action issued in U.S. Appl. No. 09/690,368, mailed Mar. 6, 2007, 10 pgs.

Office Action issued in U.S. Appl. No. 09/690,199, mailed Mar. 20, 2007, 7 pgs.

Office Action issued in U.S. Appl. No. 11/386,351, mailed Apr. 18, 2007, 7 pgs.

Office Action issued in U.S. Appl. No. 09/690,366, mailed May 3, 2007, 9 pgs.

Office Action issued in U.S. Appl. No. 09/690,199, mailed Sep. 12, 2007, 7 pgs.

Office Action issued in U.S. Appl. No. 09/690,368, mailed Oct. 5, 2007, 12 pgs.

Office Action issued in U.S. Appl. No. 09/690,366, mailed Nov. 27, 2007, 11 pgs.

Office Action issued in U.S. Appl. No. 11/386,351, mailed Nov. 27, 2007, 8 pgs.

Office Action issued in U.S. Appl. No. 09/690,368, mailed Feb. 5, 2008, 10 pgs.

Office Action issued in U.S. Appl. No. 09/690,366, mailed Sep. 3, 2008, 13 pgs.

Office Action issued in U.S. Appl. No. 09/690,368, mailed Oct. 3, 2008, 12 pgs.

Office Action issued in U.S. Appl. No. 11/386,351, mailed Oct. 7, 2008, 10 pgs.

Office Action issued in U.S. Appl. No. 09/690,366, mailed Apr. 16, 2009, 9 pgs.

Office Action issued in U.S. Appl. No. 09/690,368, mailed May 12, 2009, 9 pgs.

Examination Report issued in German Patent Application No. 10196230.4-53, dated Oct. 6, 2009 (with English Translation), 8 pgs.

Office Action issued in U.S. Appl. No. 11/386,351, mailed Feb. 19, 2010, 10 pgs.

Office Action issued in U.S. Appl. No. 09/690,368, mailed Mar. 4, 2010, 10 pgs.
Office Action issued in U.S. Appl. No. 09/690,199, mailed Jan. 30, 2006, 4 pgs.
Office Action issued in U.S. Appl. No. 09/690,199, mailed Nov. 27, 2007, 9 pgs.
International Search Report for International Patent Application No. PCT/US01/16665, mailed Jan. 17, 2002, 6 pgs.
Card, S.K., "The WebBook and the Web Forager: an Information Workspace for the World Wide Web SIGCHI," Proc. On Human Factors in Computing Systems, Dec. 1996, pp. 111-117.
Morin, J.H. et al., "HyperNews: A Media Application for the Commercialization of an Electronic Newspaper," Proc. of the Eighth Int'l Conf. on Information Knowledge Management, Nov. 1999, 10 pgs.
Allen, R.B. et al., "Metadata and Data Structures for the Historical Newspaper Digital Library," Proc. of the Eighth Int'l Conference on Information Knowledge Management, Nov. 1999.
Palmer, J.W. et al., "Digital Newspapers Explore Marketing on the Internet Communications of the ACM," vol. 42, No. 9, pp. 33-40, Nov. 1999.
Written Opinion for International Patent Application No. PCT/US01/16665, mailed Jun. 5, 2002, 8 pgs.
International Preliminary Examination Report for International Patent Application No. PCT/US01/16665, mailed Nov. 12, 2002, 4 pgs.
Office Action issued in U.S. Appl. No. 09/690,680, mailed Feb. 28, 2003, 8 pgs.
Adobe Acrobat Reader 4.0 Guide, created Oct. 21, 1999, Adobe Systems Inc., pp. 1-83.
Office Action issued in U.S. Appl. No. 09/690,680, mailed Aug. 7, 2003, 6 pgs.
Examination Report issued in United Kingdom Patent Application No. GB 0224451.5 dated Nov. 13, 2003, 3 pgs.
Office Action issued in U.S. Appl. No. 09/690,199, mailed Dec. 3, 2003, 7 pgs.
Office Action issued in U.S. Appl. No. 09/690,677, mailed Jan. 29, 2004, 20 pgs.
Office Action issued in U.S. Appl. No. 09/690,680, mailed Feb. 6, 2004, 6 pgs.
Office Action issued in U.S. Appl. No. 09/690,199, mailed Jun. 7, 2004, 7 pgs.
Office Action issued in U.S. Appl. No. 09/690,366, mailed Jun. 17, 2004, 8 pgs.
Office Action issued in U.S. Appl. No. 09/690,368, mailed Jun. 28, 2004, 7 pgs.
Examination Report issued in United Kingdom Patent Application No. GB 0224451.5 dated Jul. 2, 2004, 2 pgs.
seattletimes.com, Jan. 24, 1999 (http://web/archive.org/web/19990125091902/http://seattletimes.com), 2 pgs.
Motorola, Flex Script Programmer'sGuide, Version 2.0, Apr. 1999 (http://www.frogfire.com/frogfire_archive/Motorola-spi/library_files/PROGGD20.Pdf), 2 pgs.
Office Action issued in U.S. Appl. No. 09/690,368, mailed Sep. 21, 2004, 8 pgs.
Examination Report issued in United Kingdom Patent Application No. GB 0224451.5 dated Nov. 15, 2004, 2 pgs.
Office Action issued in U.S. Appl. No. 09/690,367, mailed Jan. 4, 2005, 8 pgs.
Office Action issued in U.S. Appl. No. 09/690,199, mailed Jan. 13, 2005, 7 pgs.
Office Action issued in U.S. Appl. No. 09/690,366, mailed Feb. 9, 2005, 8 pgs.
Office Action issued in U.S. Appl. No. 09/690,368, mailed Apr. 5, 2005, 10 pgs.
Word 97-Ease of Use (http://archive.baarns.com/office97/word/word9704.asp).
Office Action issued in U.S. Appl. No. 09/690,367, mailed Jun. 14, 2005, 8 pgs.
Office Action issued in U.S. Appl. No. 09/690,199, mailed Jun. 22, 2005, 8 pgs.
Office Action issued in U.S. Appl. No. 09/690,366, mailed Jul. 26, 2005, 12 pgs.
Office Action for U.S. Appl. No. 12/790,419, mailed Mar. 15, 2012, 31 pgs.
Notice of Allowance for U.S. Appl. No. 12/790,419, mailed Sep. 11, 2012, 4 pgs.

* cited by examiner

302

304

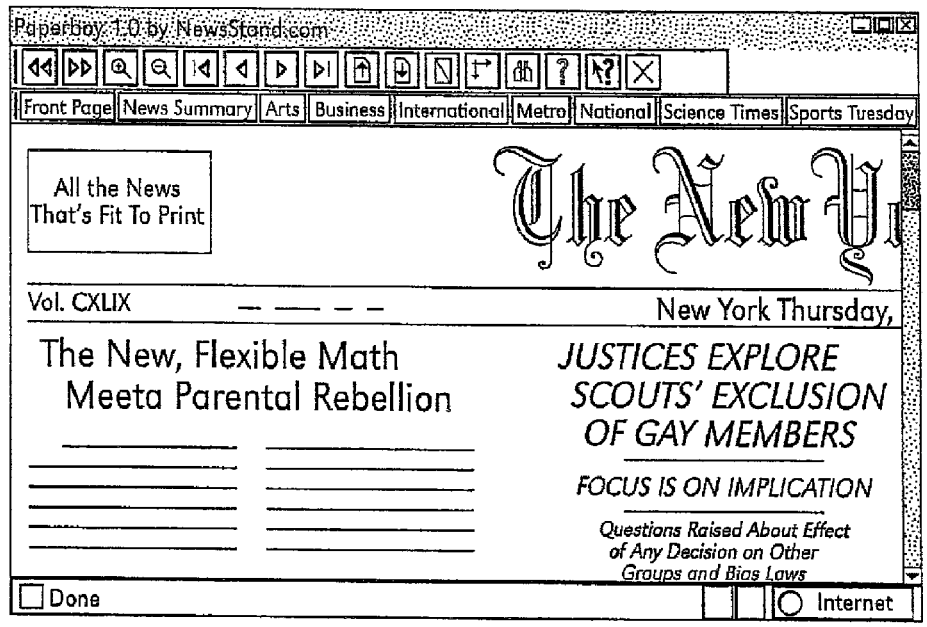
312
Fig. 3f    314 DIRECTION OF PAN
316
Fig. 3g

318

320

322  326 ZOOM IN (LARGER)  324 ZOOM OUT (SMALLER)

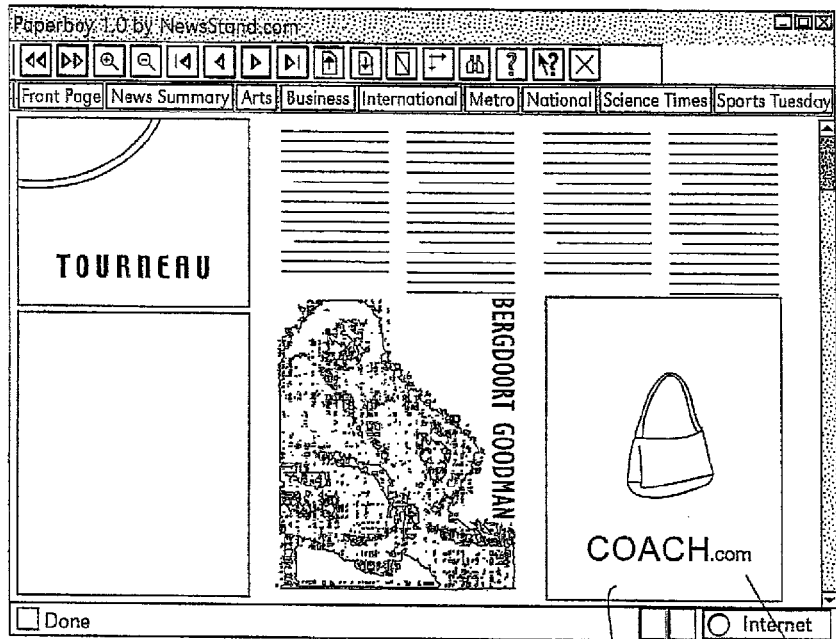
374
378
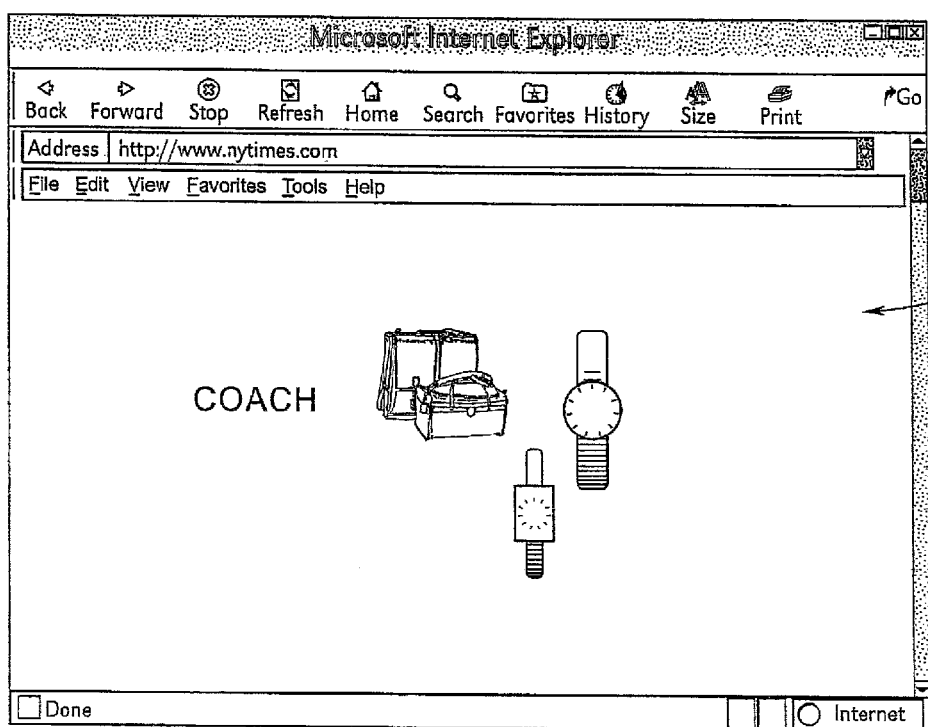
380
376
Fig. 3n

390

392

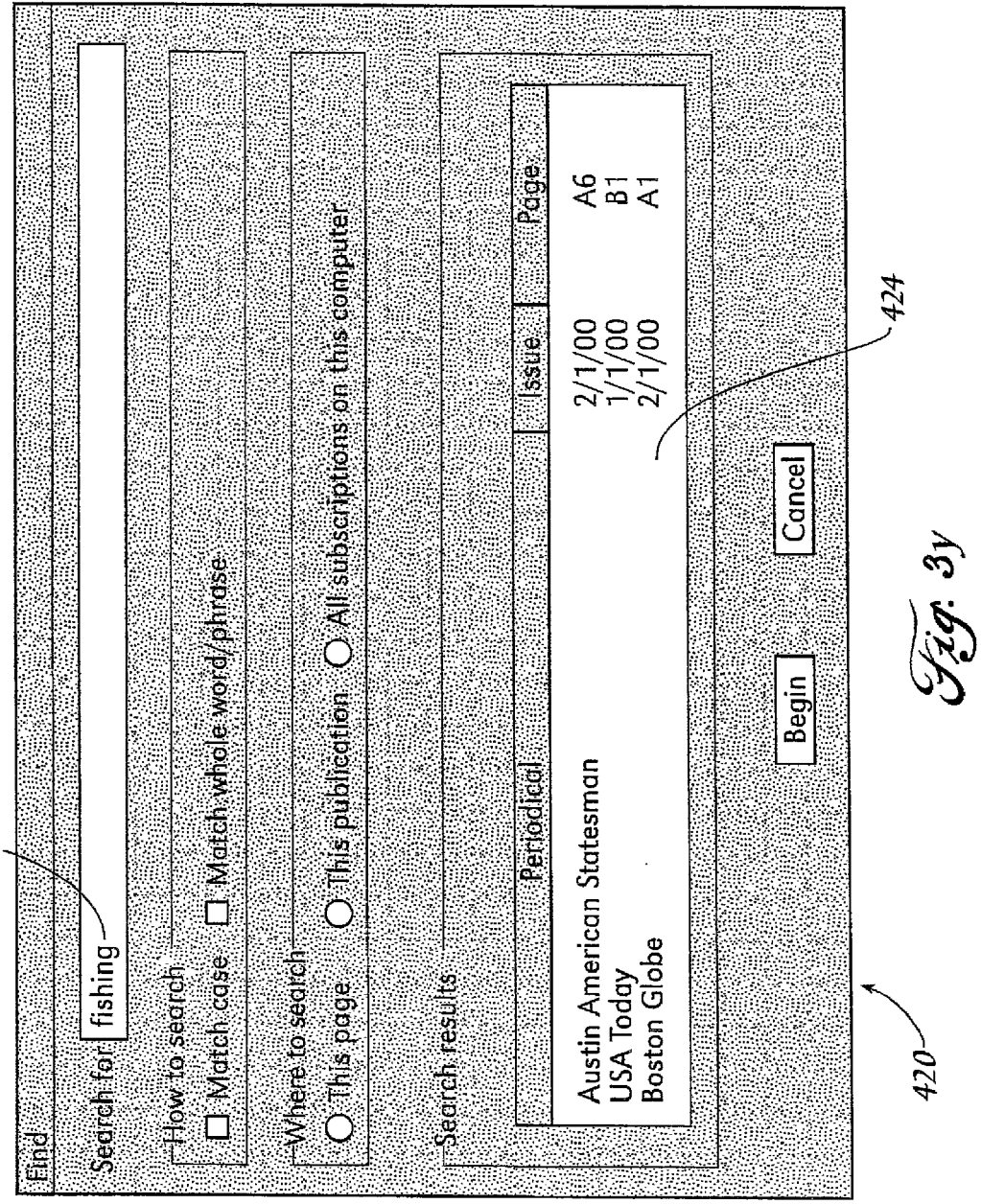

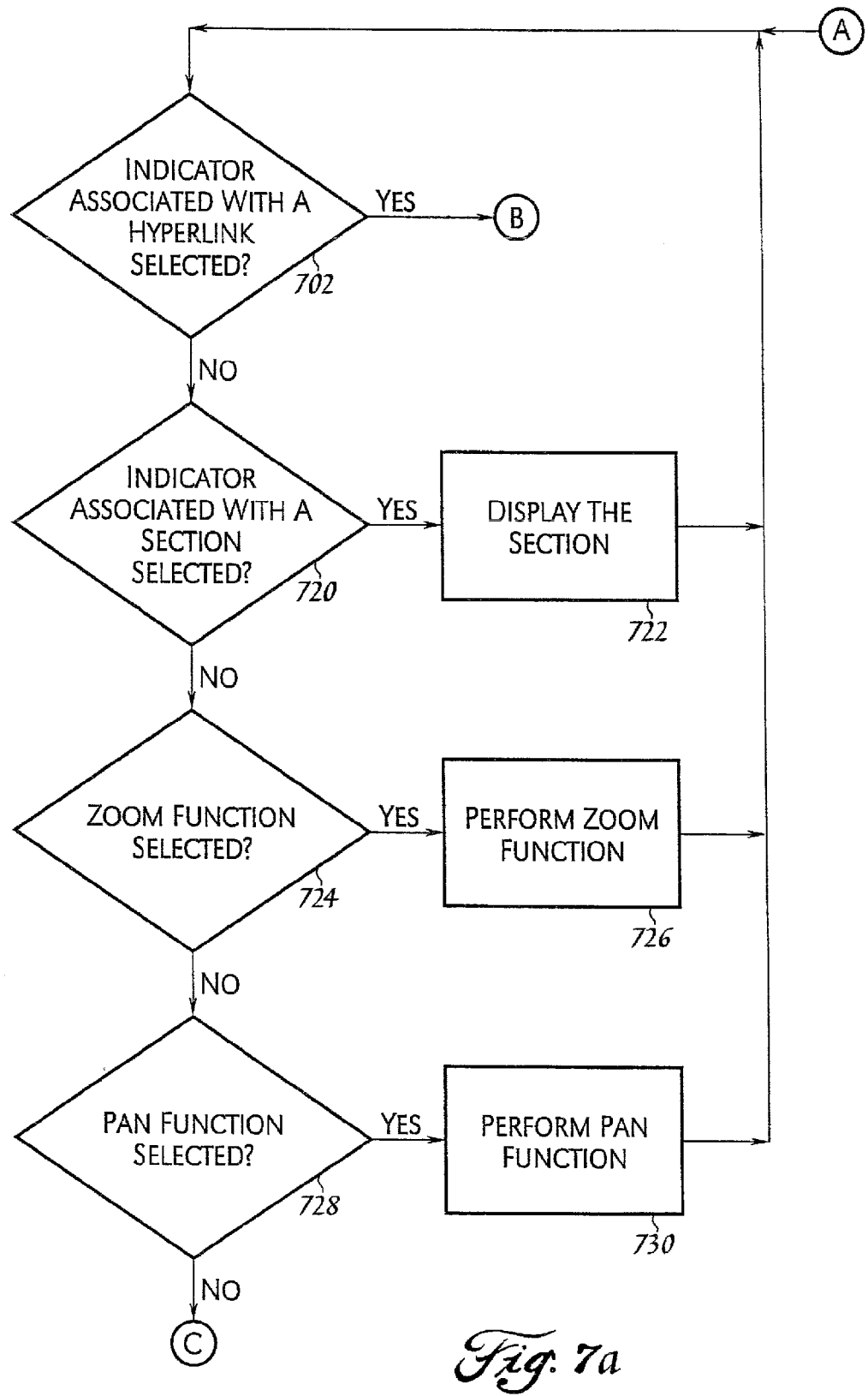

METHOD, SYSTEM AND COMPUTER PROGRAM PRODUCT FOR PROVIDING DIGITAL CONTENT

CROSS-REFERENCE TO RELATED APPLICATIONS

This application is a continuation of, and claims a benefit of priority under 35 U.S.C. 120 of the filing date of U.S. patent application Ser. No. 09/690,366, by inventor Billy P. Taylor, entitled "METHOD AND SYSTEM FOR FORMING A HYPERLINK WITHIN A DIGITAL VERSION OF A MASS-PRODUCED PRINTED PAPER" filed on Oct. 16, 2000, which in turn claims the benefit of priority under 35 U.S.C. §119 to provisional patent application No. 60/208, 015, by inventor Billy P. Taylor, entitled "SYSTEM AND METHOD FOR PREPARING PRINTED MATTER FOR DELIVERY TO PERSONAL COMPUTERS" filed May 26, 2000, the entire contents of which are hereby expressly incorporated by reference for all purposes This application relates to co-pending U.S. patent applications (a) Ser. No. 09/690,368, entitled "METHOD, SYSTEM AND COMPUTER PROGRAM PRODUCT FOR DISPLAYING A VERSION OF A PAPER"; (b) Ser. No. 09/690, 199, entitled "METHOD AND SYSTEM FOR FORMING A HYPERLINK REFERENCE AND EMBEDDING THE HYPERLINK REFERENCE WITHIN AN ELECTRONIC VERSION OF A PAPER," now U.S. Pat. No. 7,447,771; (c) Ser. No. 09/690,680, entitled "METHOD AND SYSTEM FOR IDENTIFYING A SELECTABLE PORTION OF A DIGITAL VERSION OF A MASS-PRODUCED PRINTED PAPER", now U.S. Pat. No. 6,850,260; (d) Ser. No. 09/690, 367, entitled "METHOD AND SYSTEM FOR TRANSLATING A DIGITAL VERSION OF A PAPER," now U.S. Pat. No. 7,181,679; and (e) Ser. No. 09/690,677, entitled "METHOD AND SYSTEM FOR REPLACING CONTENT IN A DIGITAL VERSION OF A MASS-PRODUCED PRINTED PAPER," now U.S. Pat. No. 6,845,273. Each of these co-pending applications were filed Oct. 16, 2000, names Billy P. Taylor as an inventor, and is incorporated herein by reference in its entirety, and is assigned to the assignee of this application.

BACKGROUND

The disclosures herein relate generally to information processing systems, and more particularly to a method and system for displaying a digital version of a mass-produced printed paper.

Newspapers, magazines, trade journals, and other periodicals and mass-produced printed papers have existed in various forms for several hundred years. Many consumers consider such papers to be highly credible, entertaining and/or efficient sources of information. In contrast, many consumers may view the appearance of an Internet site ("website") as being less appealing and more cumbersome to navigate.

Publishers of mass-produced printed papers have encountered declining readership and increasing production costs. In response, many of these publishers have established respective websites to display some, but often not all, of the printed content of their papers. Nevertheless, many of these websites have failed to generate adequate revenue to support themselves. One reason could be that many consumers may view the appearance of such a website as being less appealing than the mass-produced printed paper itself and more cumbersome to navigate.

Accordingly, a need has arisen for a method and system for displaying a digital version of a mass-produced printed paper, in which consumers may view the appearance of a digital version as being at least as appealing as the mass-produced printed paper itself and less cumbersome to navigate.

SUMMARY

According to one embodiment, a method performed by a computer system. The method includes storing a version of a mass-produced printed paper, identifying at least a subset of characters within the version, and in response to the identified subset, forming at least one hyperlink within the version, the version being displayable on a display device as a likeness of the paper including an indicator of a hyperlink.

A principal advantage of these embodiments is that various shortcomings of previous techniques are overcome. For example, a principal advantage of these embodiments is that consumers may view the appearance of a digital version as being at least as appealing as the mass-produced printed paper itself and less cumbersome to navigate.

BRIEF DESCRIPTION OF THE DRAWINGS

FIG. 3f is an illustration of a fourth screen displayable by a display device of the system of FIG. 1.

FIG. 3g is an illustration of a fifth screen displayable by a display device of the system of FIG. 1.

FIG. 3n is an illustration of a twelfth screen and a thirteenth screen displayable by a display device of the system of FIG. 1.

FIG. 3y is an illustration of a second menu box displayable by a display device of the system of FIG. 1.

FIG. 3aa is an illustration of a fourth menu box displayable by a display device of the system of FIG. 1.

FIG. 3bb is an illustration of a fifth menu box displayable by a display device of the system of FIG. 1.

FIG. 7a is a flowchart of an embodiment of operations performed by the system of FIG. 1 for performing various functions with a digital version of a mass-produced printed paper.

FIG. 7b is a first extension of the flowchart of FIG. 7a.

FIG. 7c is a second extension of the flowchart of FIG. 7a.

FIG. 7d is a third extension of the flowchart of FIG. 7a.

DETAILED DESCRIPTION

Figure 1:
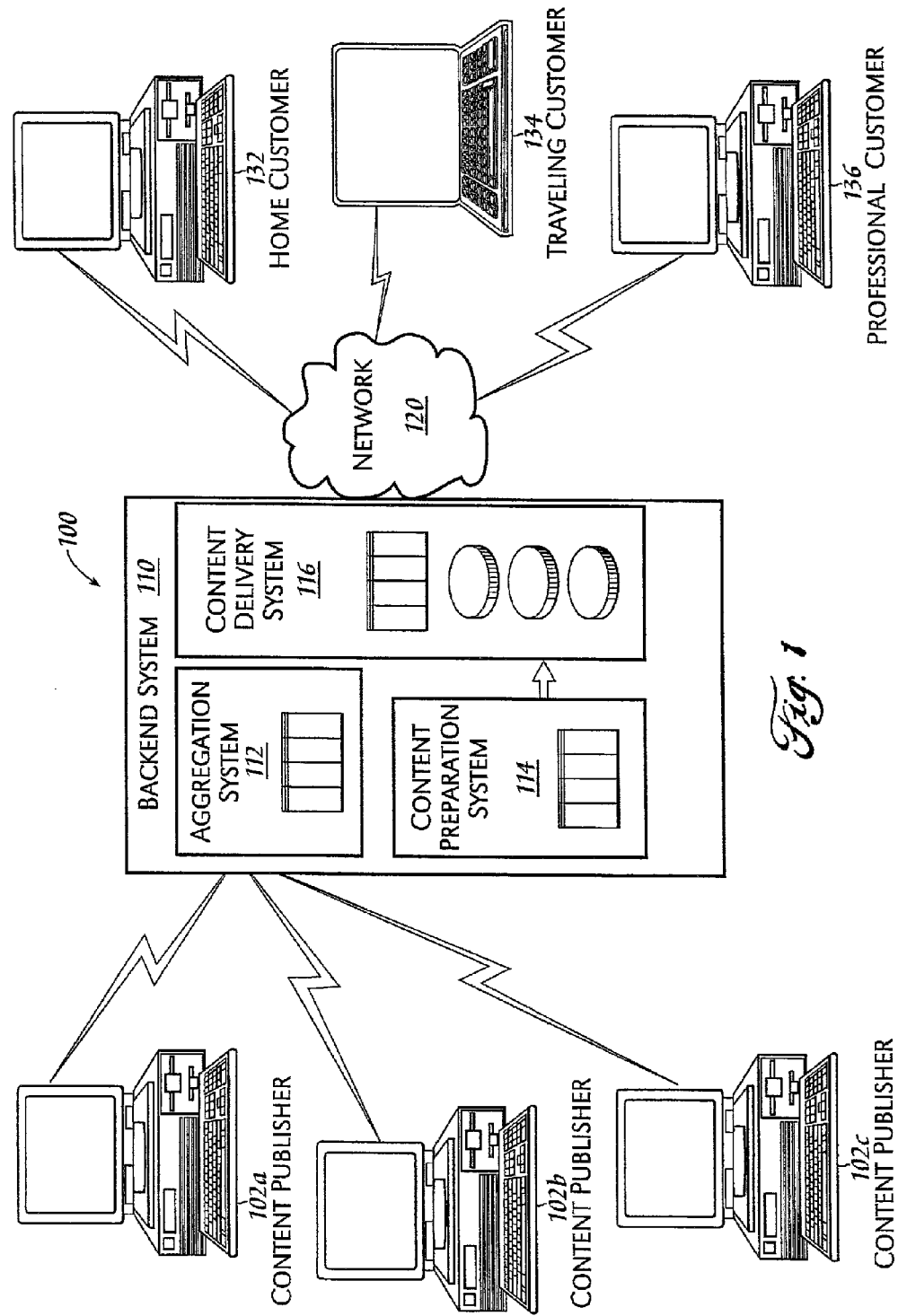
FIG. 1 is a diagram of an embodiment of a system according to the illustrative embodiment.

FIG. 1 is a diagram of an embodiment of a system, indicated generally at 100, according to the illustrative embodiment. A mass-produced printed paper includes any mass-produced printed material (e.g., paper, newsprint, newspaper, or other hardcopy document) that is distributed to a large audience, as for example by mass-market publication or distribution to a large private audience. Mass-produced includes being manufactured in large quantities, as for example by assembly-line techniques. Mass-market includes being of, relating to, or produced for consumption by large numbers of people. Publication includes the distribution of printed material to the public by sale or other transfer of ownership, or by rental, lease, or lending, including for example the offering to distribute printed material to a group of persons for purposes of further distribution, public performance, or public display. Hardcopy includes a printed copy of the output of a computer or word processor or other device.

In FIG. 1, content publisher computer systems 102a, 102b, and 102c output versions of mass-produced printed papers (e.g. periodicals) to a system 110. System 110 includes (a) an aggregation system 112 for receiving such versions from systems 102a, 102b, and 102c and (b) a content preparation system 114 for translating such versions from a first format to a second format. Also, system 110 includes a content delivery system 116 for receiving the translated versions from system 114 and outputting the translated versions through a network 120 (e.g. a global communications network) to other computer systems. For example, a home customer computer system 132 (e.g. a personal computer system), a traveling customer computer system 134 (e.g. a laptop computer system), and a professional customer computer system 136 (e.g. a server computer system) receive the translated versions from network 120. In response to the translated versions, systems 132, 134, and 136 display likenesses of the mass-produced printed papers to respective users, as discussed further hereinbelow in connection with FIGS. 3b through 3bb. Aggregation system 112, content preparation system 114, and content delivery system 116 are all integral in an illustrative embodiment as a single server.

For example, system 110 receives versions of periodicals from systems 102a, 102b, and 102c. Notably, a content publisher (e.g. a user or operator of systems 102a, 102b, or 102c) may compile different parts (or "sections") of a periodical at different times. Before printing sections that are more volatile (e.g. more likely to change in response to evolving newsworthy events), a content publisher (e.g. a newspaper publisher) may print sections that are less volatile (e.g. less likely to change in response to evolving newsworthy events).

Examples of less volatile sections of a newspaper may include a classified advertisements section, a real estate section, and a comics section. Examples of more volatile sections of a newspaper may include a front page or front section, a sports section, and a business section. In response to receiving different sections at different times from systems 102a, 102b, or 102c, aggregation system 112 buffers the sections for subsequent processing by content preparation system 114.

Within system 100, the various sections of a version of a mass-produced printed paper are stored (e.g. by systems 102a, 102b, 102c, and 110) as one or more files, which may have the same or different file types, such as .pdf, .tif, or any other suitable file format. Before outputting the files to system 110, systems 102a, 102b, and/or 102c may compress and/or encrypt one or more of the files. In response to receiving one or more compressed and/or encrypted files, system 110 suitably decompresses or decrypts them.

The file format of the version of the mass-produced printed paper received by system 112 from the content publisher system (e.g. 102a, 102b, or 102c) may not be well-suited for processing by a consumer's computing device such as a personal computer. For example, with such a file format, a single newspaper page may occupy more than 5 megabytes of memory space, so that a single daily newspaper may occupy more than 400 megabytes. Moreover, a single newspaper page may render to approximately 4000×7000 pixels at a 1:1 ratio, while a personal computer display might accommodate only 1024 horizontal pixels at any single moment. Accordingly, content preparation system 114 translates the version of the mass-produced printed paper from a first format to a second format that is more suitable for processing by a consumer's computing device.

Content preparation system 114 rasterizes, decimates, compresses, and encrypts the version received by system 112 from a content publisher system. Content preparation system 114 translates the received version into a new version having one or more file types such as Windows Bitmap (.bmp) or JPEG (.jpg) files. Content preparation system 114 also extracts and identifies distinctive characters and terms (e.g. including multiple characters per term) from the received version and creates an index that correlates such terms to their respective associated locations in pages of the new version.

The characters may include alphanumeric characters and other symbols, such as a picture. In response to the index, system 114 forms hyperlinks within the new version, so that terms are linked (through the hyperlinks) to their respective associated locations in pages of the new version, as discussed further hereinbelow in connection with FIGS. 3*b-bb*. The hyperlinks may be embedded within the new version. In addition, from the version received by system 112, system 114 detects "hooks" (e.g. references) to other files, scripts, or websites associated with the version received by system 112 from the content publisher system. In response to the detected hooks, system 114 forms hyperlinks to the associated files, scripts, or websites, such as (a) media files that include audio signals and/or visual images (e.g. graphics, photographs, or video), (b) a website of an advertiser in the mass-produced printed paper, and (c) executable scripts. Also, in response to its programmed instructions, system 114 is operable to replace a portion of the version (received by system 112 from a content publisher system) with other content. For example, system 114 is operable to replace one advertisement or article (e.g. in the version of a periodical) with another advertisement or article. One embodiment of a technique for translating the version is shown and discussed in more detail further hereinbelow in connection with FIG. 4.

Content preparation system 114 outputs the translated version to content delivery system 116. Content delivery system 116 operates as a portal to output such translated versions to customers (e.g. 132, 134, 136) through network 120. With a computer system (e.g. home customer computer system 132, traveling customer computer system 134, or professional customer computer system 136), a human user may receive and view such translated versions. Content delivery system 116 authenticates identities of such customers and collects (e.g. via credit card payment) any required subscription costs or fees associated with a mass-produced printed paper that the human user (e.g. of system 132, 134 or 136) wishes to receive and view. In response to its programmed instructions, content delivery system 116 is operable to permit a particular customer to receive and display (for viewing by a human user) only specified sections of a mass-produced printed paper (e.g. periodical). For example, the particular customer may select this option in situations where the customer's human user has little or no interest in other sections of such paper. By selecting fewer sections to receive and display, the time required to receive and display is advantageously reduced.

In the display by customers 132, 134 and 136 of the translated version of the mass-produced printed paper (for viewing by a human user), the version appears to the human user as a likeness of the mass-produced printed paper. The likeness is a replication or a virtual representation of the actual mass-produced printed paper. Moreover, the displayed likeness includes additional features, such as hyperlinks between various pages within the mass-produced printed paper, hyperlinks to websites, hyperlinks to media files, and hyperlinks to scripts that are executable by computer systems 132, 134, and 136. Such additional features are discussed further hereinbelow in connection with FIGS. 3*b* through 3*bb*.

In the illustrative embodiment, network 120 is a transport control protocol/Internet protocol ("TCP/IP") global communications network, such as the Internet or an intranet. The communications network includes land-based and satellite-based communications devices, or alternatively other types of communications technologies. In the illustrative embodiment, customer computer systems 132, 134, and 136 include various types of systems that are programmable to display a translated version of a mass-produced printed paper. Examples of such computer systems are a personal computer, a laptop computer, a server computer, a television set-top device, a handheld communications device (e.g. cellular telephone or personal digital assistant ("PDA")).

The number of content publisher computer systems 102*a*, 102*b*, and 102*c* and customer computer systems 132, 134, and 136 shown in FIG. 1 is shown by way of example. The system may include any number of content publisher computer systems and customer computer systems and may also include multiple systems 110 and networks 120.

Figure 2:
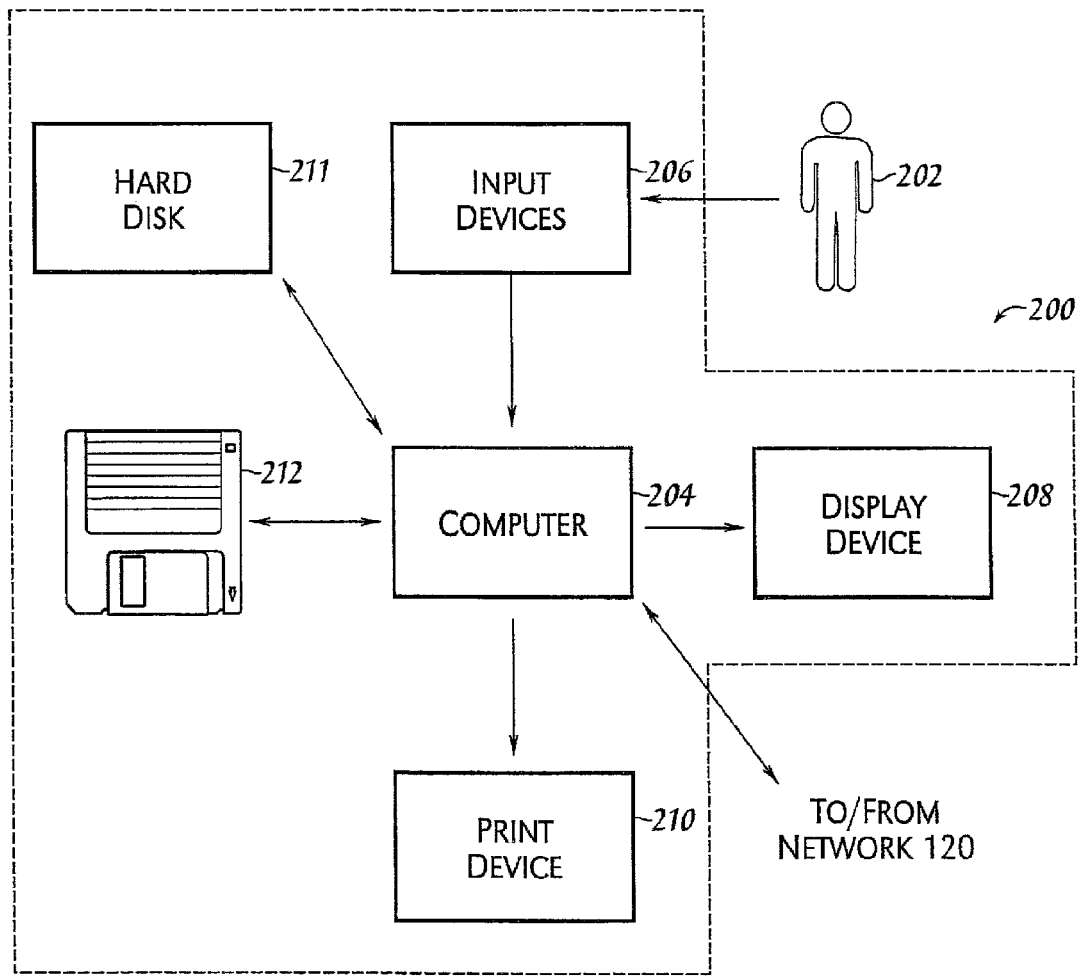
FIG. 2 is a block diagram of a representative one of the computer systems of the system of FIG. 1.

FIG. 2 is a block diagram of a representative one of computer systems 132, 134 and 136. Such representative computer system is indicated by dashed enclosure 200. Each of the computer systems of FIG. 1 operates in association with a respective human user. Accordingly, in the example of FIG. 2, computer system 200 operates in association with human user 202, as discussed further hereinbelow.

As shown in FIG. 2, computer system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, (d) a print device 210 (e.g. a conventional electronic printer or plotter), (e) a nonvolatile storage device 211 (e.g. a hard disk drive or other computer-readable medium (or apparatus), as discussed further hereinbelow) for storing information, (f) a computer-readable medium (or apparatus) 212 (e.g. a portable floppy diskette) for storing information, and (g) various other electronic circuitry for performing other operations of computer system 200.

For example, computer 204 includes (a) a network interface (e.g. circuitry) for communicating between computer 204 and network 120 and (b) a memory device (e.g. random access memory ("RAM") device and read only memory ("ROM") device) for storing information (e.g. instructions executed by computer 204 and data operated on by computer 204 in response to such instructions). Accordingly, computer 204 is connected to network 112, input devices 206, display device 208, print device 210, storage device 211, and computer-readable medium 212, as shown in FIG. 2.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device prints visual images on paper, and user 202 views such visual images.

Input devices 206 include, for example, a conventional electronic keyboard or keypad and a pointing device such as a conventional electronic "mouse", rollerball, or light pen. User 202 operates the keyboard or keypad to output alphanumeric text information from the keyboard. User 202 operates the pointing device to output cursor-control information to computer 204, and computer 204 receives such cursor-control information from the pointing device.

As discussed further hereinabove in connection with FIG. 1, system 200 is operable to receive, store (e.g. in a computer-readable medium) and display a translated version of a mass-produced printed paper as a likeness of the mass-produced printed paper. For example, as discussed further hereinbelow in connection with FIGS. 3*b* through 3*bb*, computer 204 executes a program for displaying the translated version on display device 208 as a likeness of the mass-produced printed paper, and for modifying such display of the translated version in response to information received from user 202.

Figure 3A:
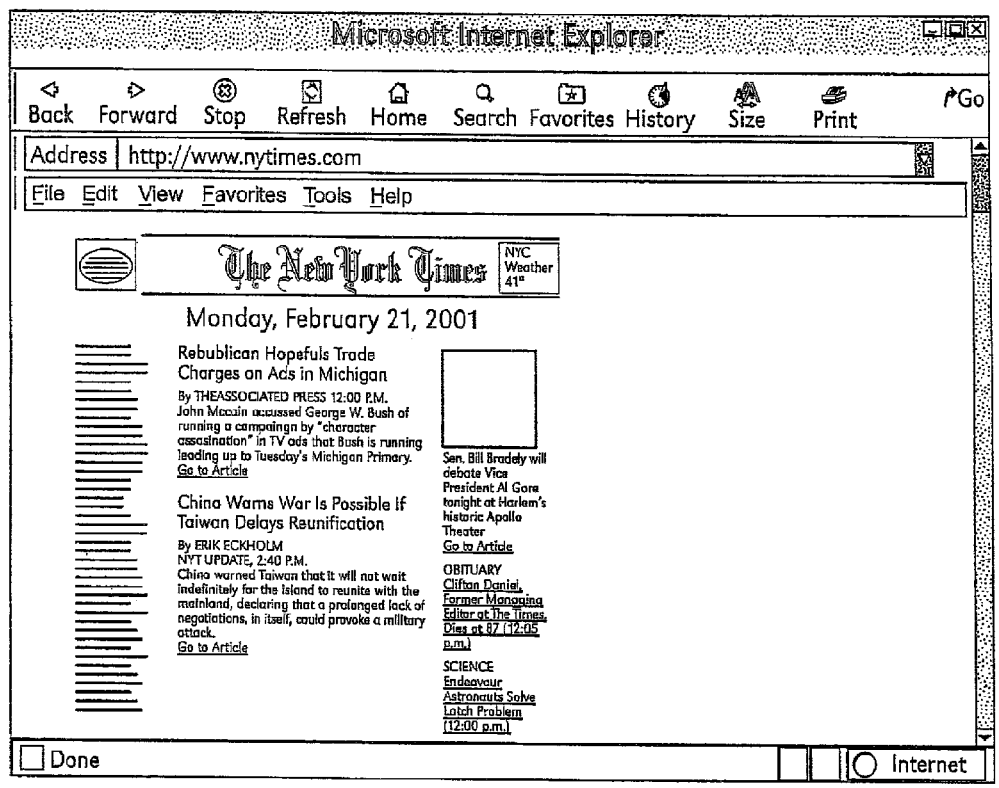
FIG. 3a is an illustration of a screen of a prior art website of a periodical.

FIG. 3a is an illustration of a screen 302 of a prior art website of a mass-produced printed periodical, namely the New York Times. As shown in screen 302, the website differs from the mass-produced printed periodical, and the website is not a likeness of the mass-produced printed periodical. Although the website includes hyperlinks for navigating between various locations therein, such locations are different from the mass-produced printed periodical. The website fails to include all of the content of the mass-produced printed periodical.

Figure 3B:
FIG. 3b is an illustration of a first screen displayable by a display device of the system of FIG. 1.

FIGS. 3b through 3bb are illustrations of screens displayable by a display device as a likeness of a mass-produced printed paper (e.g. periodical). In the following discussion, the display device (e.g. display device 208) is part of a human user's associated computing device (e.g. computer system 200). In response to the user's operation of a pointing device (e.g. of input devices 206), the computing device performs the various operations discussed further hereinbelow in connection with FIGS. 3b through 3bb.

For example, the computing device is operable to: (a) in response to the user's operation of the pointing device, reposition a pointer (or other cursor indicator) to a user-selected location on the screen; and (b) in response to the user's activation of a switch on the pointing device, perform an operation associated with the user-selected location (e.g. hyperlink). Such a pointer (or other cursor indicator) is used in connection with the screens of FIGS. 3b through 3bb for initiating performance of the various operations discussed further hereinbelow. A pointer 303 is shown in FIG. 3b but, for clarity, is not shown in FIGS. 3c through 3bb.

FIG. 3b is an illustration of a screen 304 displayable by the display device. Screen 304 is a likeness of a mass-produced printed paper (e.g. a periodical, such as the New York Times). As shown in FIG. 3b, the likeness preserves the actual appearance of the mass-produced printed periodical. In such a manner, with the computing device, the user may view a likeness of all pages of the mass-produced printed periodical, including all articles, advertisements, and other content thereof. Accordingly, the likeness preserves the actual appearance of articles, pages, and sections of the mass-produced printed periodical. As discussed further hereinbelow, the computing device displays the likeness along with additional features and functions.

Figure 3C:
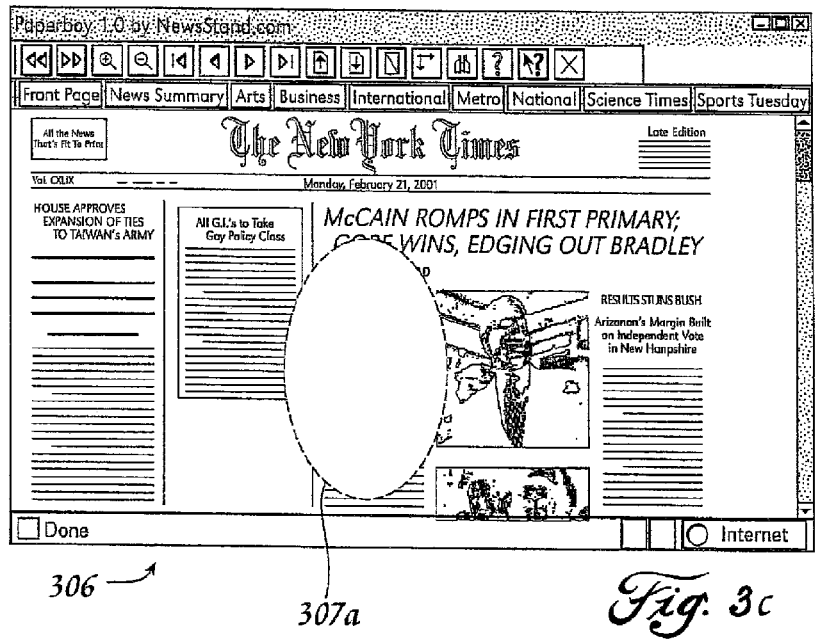
FIG. 3c is an illustration of a second screen displayable by a display device of the system of FIG. 1.
Figure 3D:
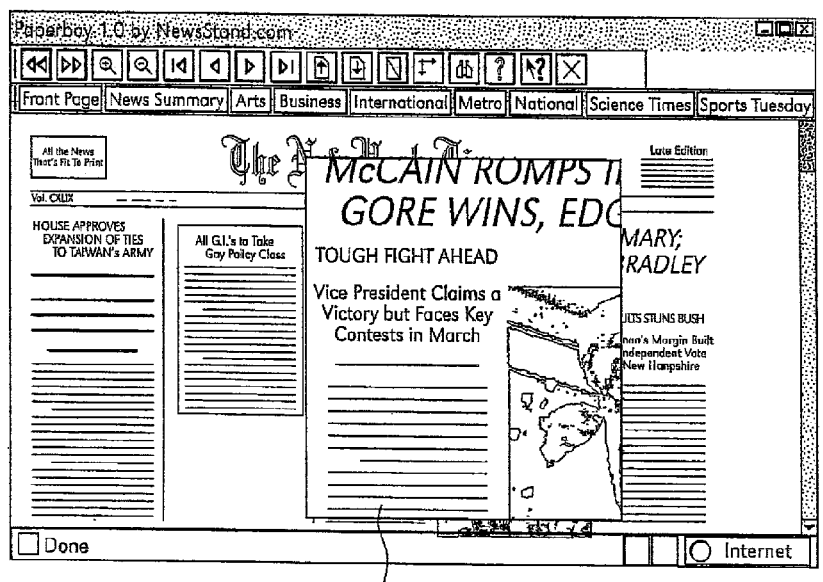
FIG. 3d is an illustration of a third screen displayable by a display device of the system of FIG. 1.

FIG. 3c is an illustration of a screen 306, and FIG. 3d is an illustration of a screen 308 displayable by the display device. FIG. 3d shows a reader window 307b which supports the user's closer view of a particular article or portion of a periodical. For example, the user may wish to more closely view an article indicated by a dashed enclosure 307a in FIG. 3c. With the pointing device, the user selects this article for display within reader window 307b, as for example by "double clicking" within dashed enclosure 307a (i.e. in rapid succession, twice activating a switch of the pointing device at a moment when the pointer is located within dashed enclosure 307a). As shown in FIG. 3d, reader window 307b displays article 307a (or other user-selected portion of the periodical) in an enlarged format, while the display device continues to concurrently display the original screen 306 in the background. With the continued display of the original screen 306 in the background, the user is more readily able to maintain his or her visual orientation on the page. The user may return to the view in screen 306 by any suitable technique, such as closing the reader window 307b or by "clicking" on the background portion of screen 308 (i.e. activating a switch of the pointing device at a moment when the pointer is located on the background portion of screen 308).

Figure 3E:
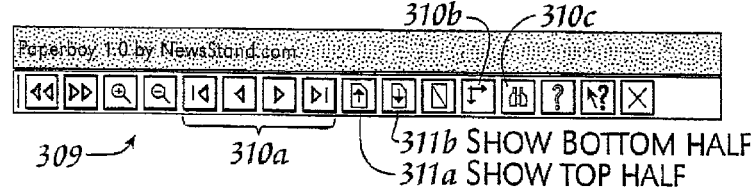
FIG. 3e is an illustration of a first toolbar displayable by a display device of the system of FIG. 1.

FIG. 3e is an illustration of a toolbar 309 displayable by the display device. By clicking on one or more buttons of toolbar 309, the user commands the computing device to perform specified operations with the displayed likeness of the periodical. For example, by clicking a suitable one of buttons 310a, the user commands the computing device to display either a first, a previous, a next, or a last page of the periodical. By clicking a button 310b, the user commands the computing device to display a user-specified section or user-specified page of the periodical. By clicking a button 310c, the user commands the computing device to search within the periodical for occurrences a user-specified term. By clicking a suitable one of buttons 311a and 311b, the user commands the computing device to display a top half or a bottom half of a page that is being then currently displayed by the computing device. For example, if a user is viewing the top half of a page such as screen 306 of FIG. 3c, the computing device displays the bottom half of the same page in response to the user clicking button 311b. Accordingly, the buttons of toolbar 309 allow the user to efficiently view different portions of the periodical.

FIG. 3f is an illustration of a screen 312, and FIG. 3g is an illustration of a screen 316 displayable by the display device. FIGS. 3f and 3g illustrate panning across a then currently displayed page. Accordingly, in the example of FIGS. 3e and 3f, a user may cause the computing device to display screen 316 by panning across screen 312 in the direction of arrow 314. As shown in FIGS. 3f and 3g by the overlapping portions of screens 312 and 316, screens 312 and 316 display different parts of the same page of a periodical. In one embodiment, a user causes the panning by "dragging" the pointer (i.e. moving the pointer while simultaneously activating a switch of the pointing device. The user may pan across the page in any direction up to the page's borders.

Figure 3H:
FIG. 3h is an illustration of a sixth screen displayable by a display device of the system of FIG. 1.
Figure 3I:
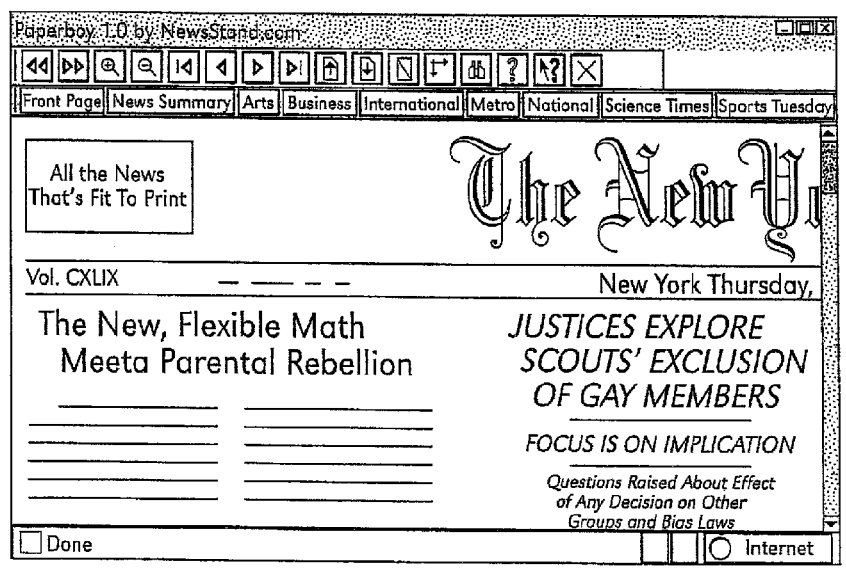
FIG. 3i is an illustration of a seventh screen displayable by a display device of the system of FIG. 1.
Figure 3J:
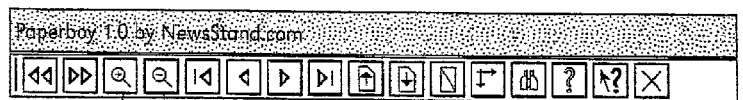
FIG. 3j is an illustration of a second toolbar displayable by a display device of the system of FIG. 1.

FIG. 3h is an illustration of a screen 318, and FIG. 3i is an illustration of a screen 320 displayable by the display device. FIGS. 3h and 3i illustrate zooming in and zooming out of a then currently displayed page. Referring also to FIG. 3j, in response to the user clicking on a zoom in button 326, the computing device magnifies the page. In response to the user clicking on a zoom out button 324, the computing device demagnifies the page. In FIG. 3i, screen 320 is a magnified (zoomed in) version of screen 318. In FIG. 3h, screen 318 is a demagnified (zoomed out) version of screen 320.

Figure 3K:
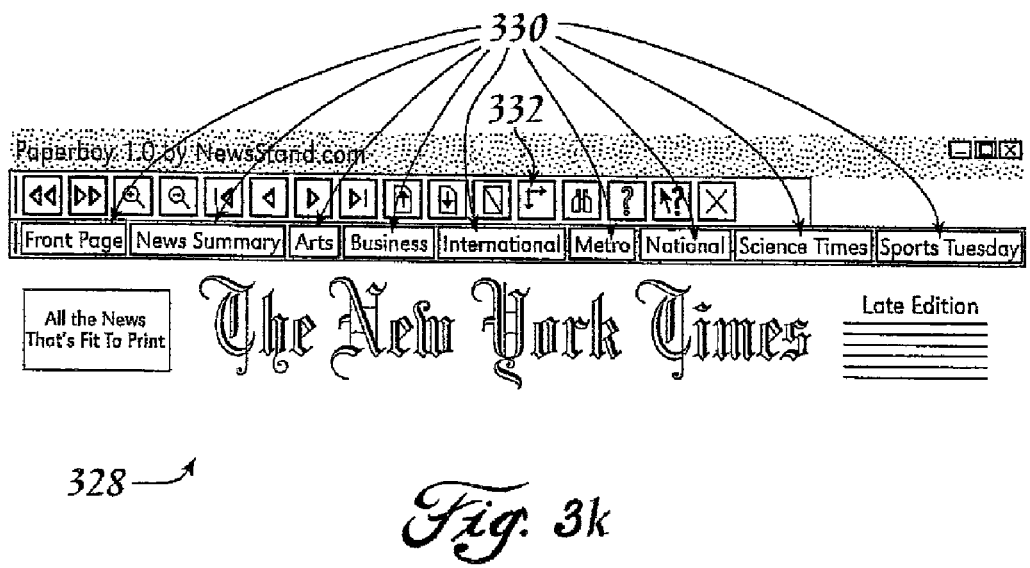
FIG. 3k is an illustration of a eighth screen displayable by a display device of the system of FIG. 1.

FIG. 3k is an illustration of a screen 328 displayable by the display device. FIG. 3k shows buttons that are clickable by a user to efficiently navigate within a displayed likeness of a periodical, such as buttons 330 and button 332. For example, many periodicals, such as newspapers include multiple sections such as business, sports, and arts. In response to the user clicking on a suitable on of buttons 330, the computing device promptly displays a section associated with the clicked button. For example, in response to the user clicking the button labeled "Arts," the computing device promptly displays a likeness of the periodical's "Arts" section. Also, in response to the user clicking button 332, the computing device displays a pull down menu that lists displayable sections and/or pages of the periodical. From the menu, with the pointing device, a user may select a particular section or page for display by the computing device.

Figure 3L:
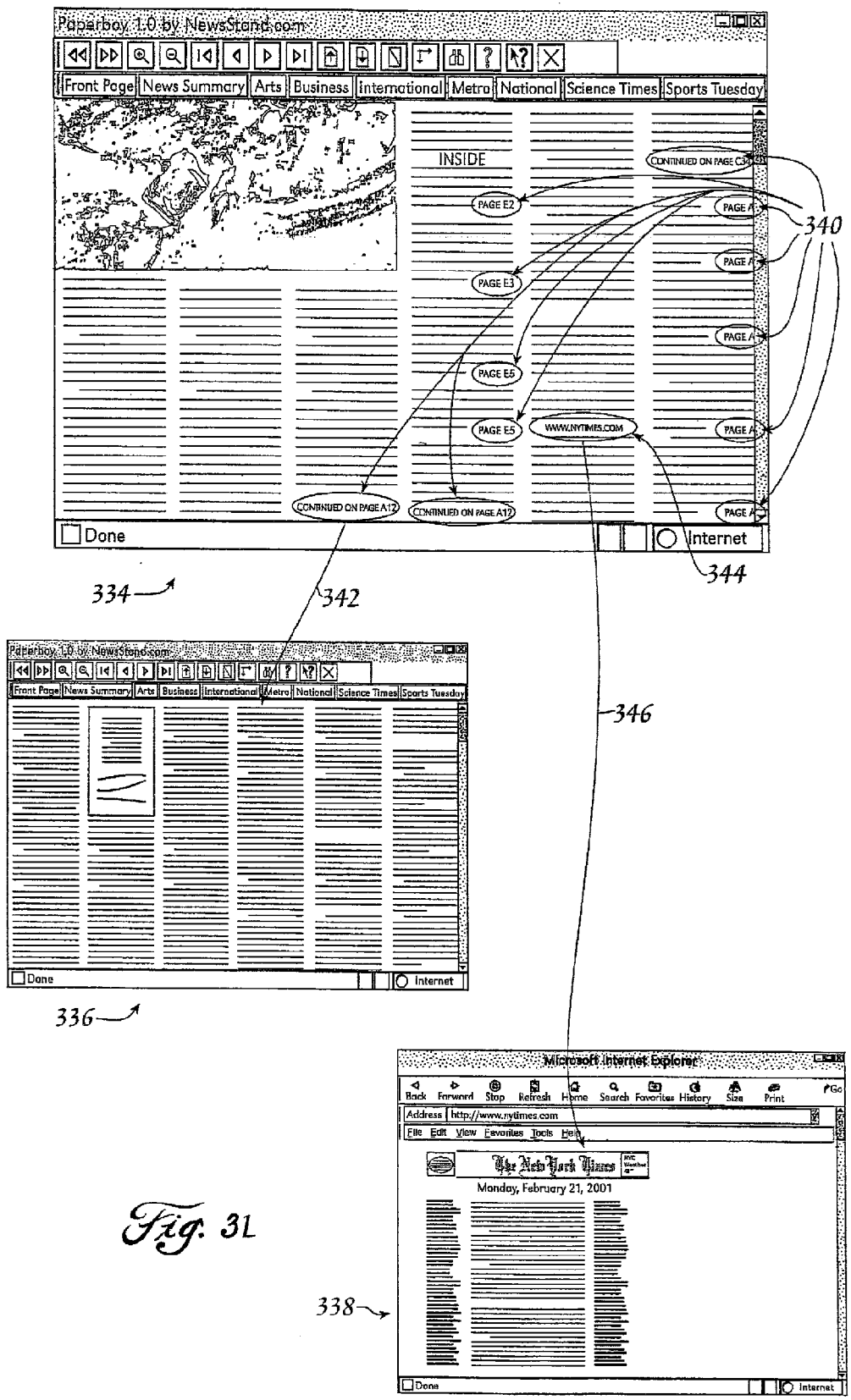
FIG. 3l is an illustration of a ninth screen, a tenth screen, and an eleventh screen displayable by a display device of the system of FIG. 1.

FIG. 3l is an illustration of a screen 334, a screen 336, and a screen 338 displayable by the display device. Screen 334 shows hyperlinks 340 and 344 that system 110 (FIG. 1) forms and embeds within the translated version. In response to the user clicking such a hyperlink, the computer system performs an operation associated with the hyperlink.

Figure 3M:
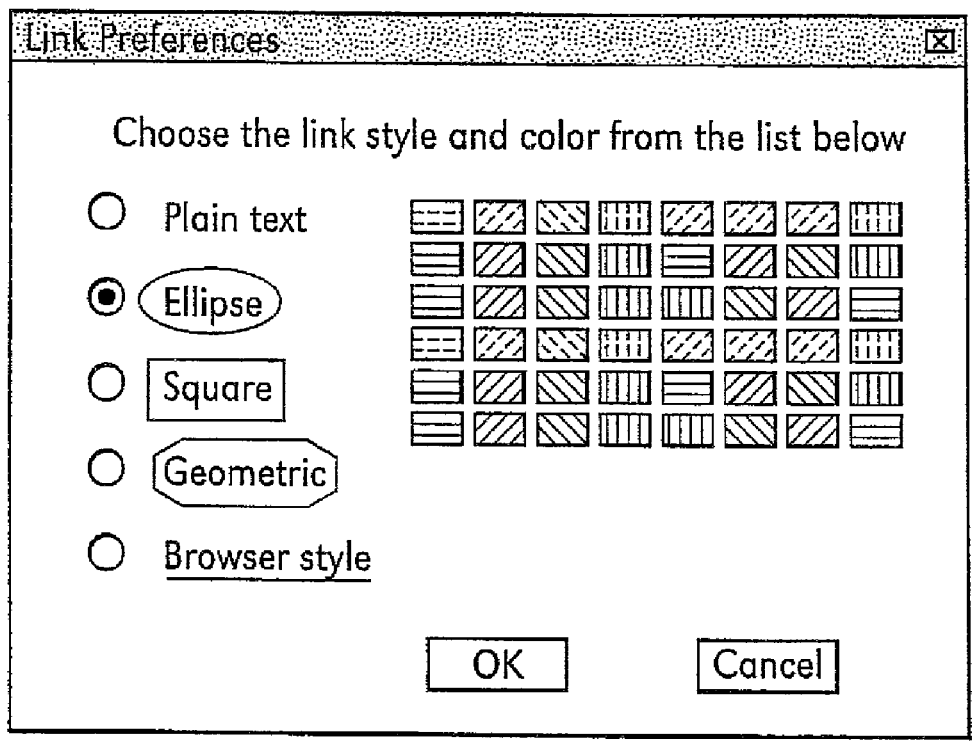
FIG. 3m is an illustration of a first menu box displayable by a display device of the system of FIG. 1.
Figure 5:
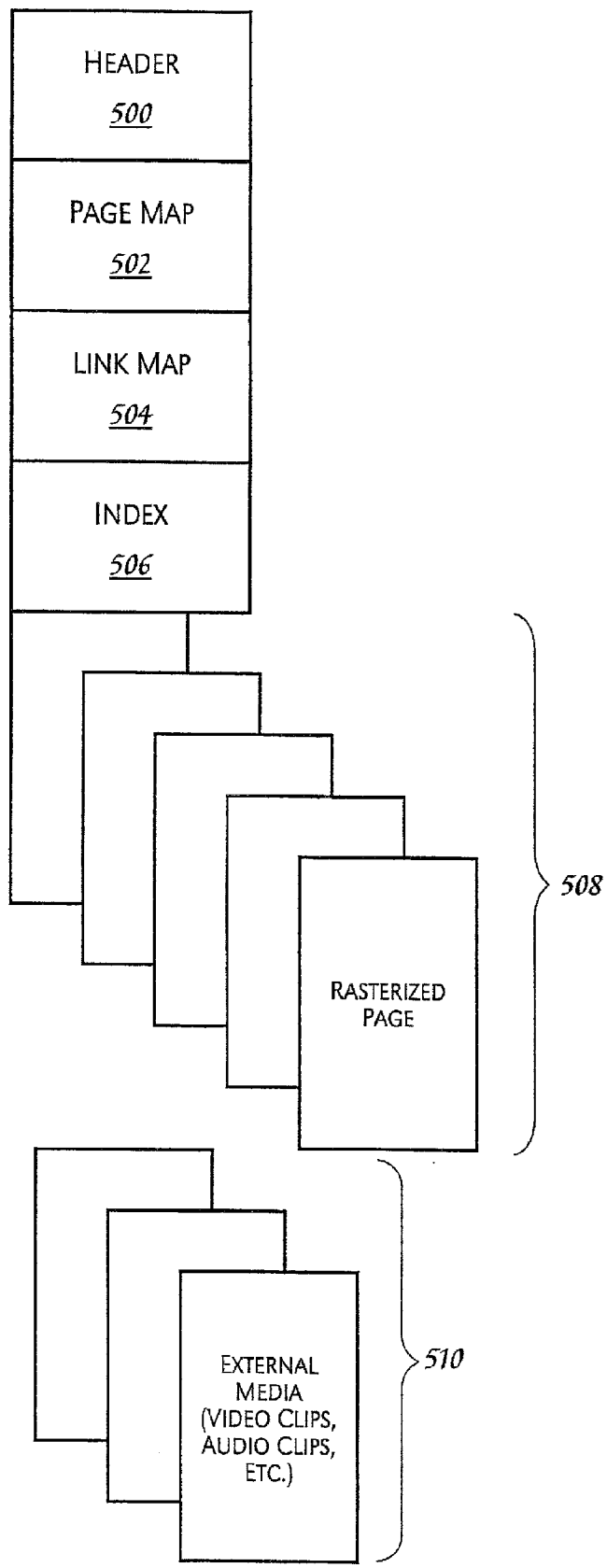
FIG. 5 is a diagram of an embodiment of a format in the system of FIG. 1 for storing a digital version of a mass-produced printed paper.

In FIG. 3l, hyperlinks 340 and 344 are highlighted by ellipses surrounding the hyperlinks. The user is able to select among various alternatives for highlighting the hyperlinks, as shown in FIG. 3m. As indicated in menu box 348 of FIG. 3m, the user is able to select the link style and color of indicators for highlighting the hyperlinks. In FIG. 5, the user-selectable link styles are plain text, ellipse, square, geometric, and browser style, and a wide variety of colors are selectable by the user.

In many mass-produced printed periodicals, articles begin on one page of the periodical and continue to one or more other pages. A portion of an article may include a term or a phrase that indicates the location of another portion of the article. Examples of such terms or phrases are "continued on page _," "see story on page _," or simply "page _."

System 110 (a) detects such terms and phrases, and (b) in response thereto, forms hyperlinks between various pages within the periodical, so that multiple portions of an article are hyperlinked together between such pages. In that manner, by selectively clicking the hyperlinks (formed and embedded by system 110 within the translated version that is displayed by the user's associated computing device), the user is able to more efficiently navigate within the displayed likeness of the periodical. As shown in FIG. 3l, such hyperlinks 340 are displayed by the computing device within the likeness of the periodical. An embodiment of this technique is discussed further hereinbelow in connection with FIG. 6. Referring again to FIG. 3l, in response to the user clicking a suitable one of hyperlinks 340, the computing device promptly displays the hyperlink's associated page (screen 336) as indicated by arrow 342.

Mass-produced printed periodicals may also include website addresses, such as http://www.nytimes.com or www.nytimes.com. System 110 (a) detects such addresses, and (b) in response thereto, forms hyperlinks within the periodical to the website addresses. In this manner, by selectively clicking the hyperlinks (formed and embedded by system 110 within the translated version that is displayed by the user's associated computing device), the user is able to more efficiently navigate to the websites. As shown in FIG. 3l, such hyperlinks (e.g. hyperlink 344) are displayed by the computing device within the likeness of the periodical. An embodiment of this technique is discussed further hereinbelow in connection with FIG. 6. Referring again to FIG. 3l, in response to the user clicking hyperlink 344 (associated with the website address www.nytimes.com), the computing device promptly displays the hyperlink's associated website (screen 338) as indicated by arrow 346.

Figure 3O:
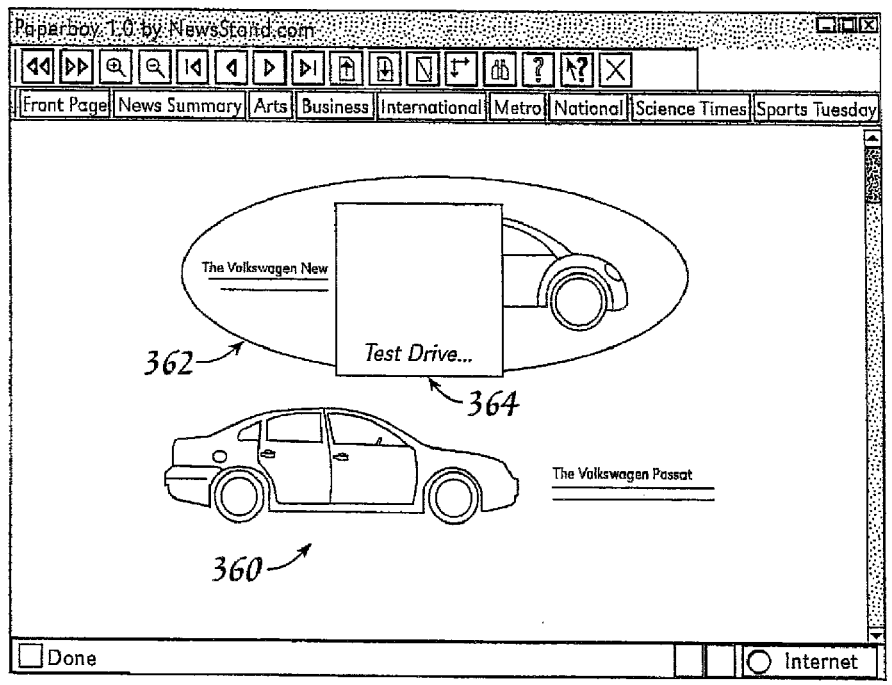
FIG. 3o is an illustration of a fourteenth screen displayable by a display device of the system of FIG. 1.
Figure 3P:
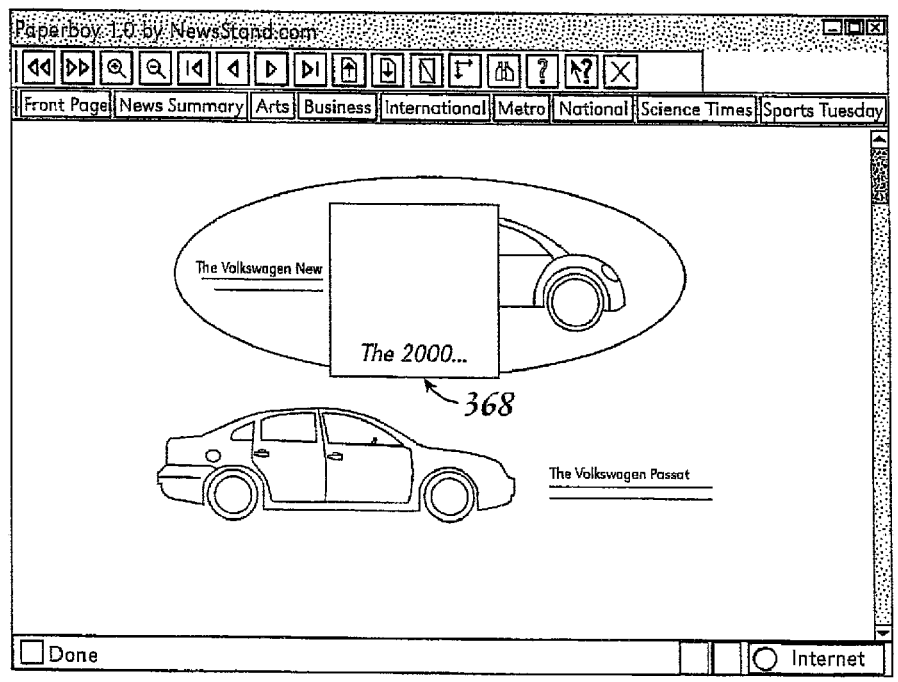
FIG. 3p is an illustration of a fifteenth screen displayable by a display device of the system of FIG. 1.
Figure 3Q:
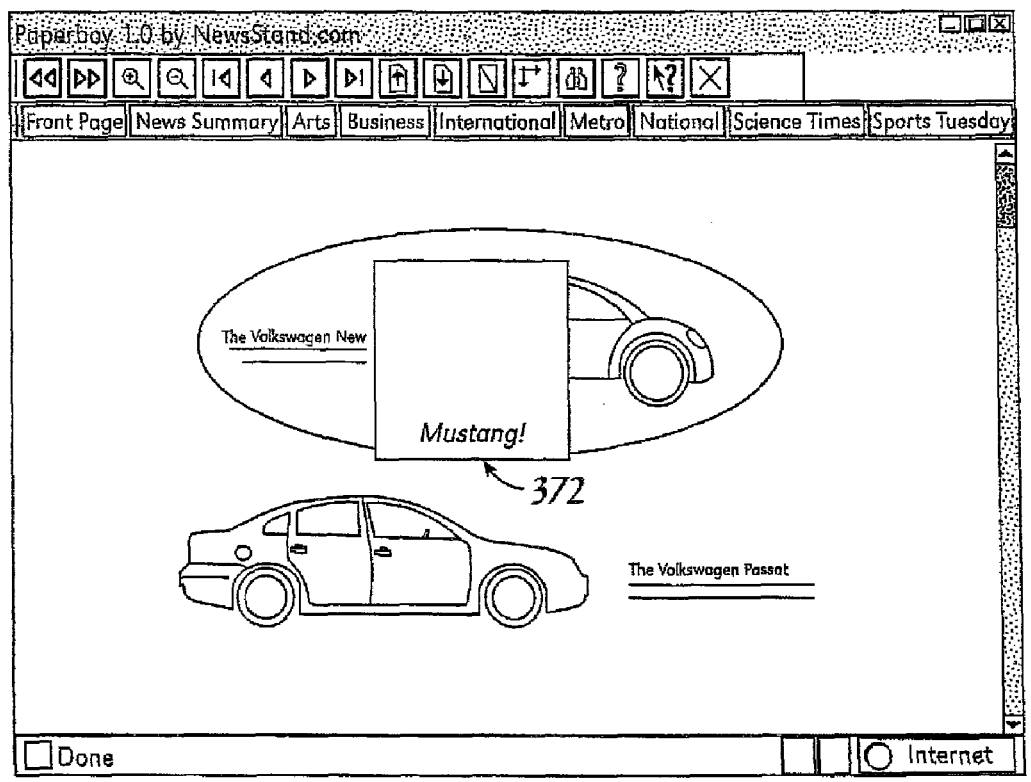
FIG. 3q is an illustration of a sixteenth screen displayable by a display device of the system of FIG. 1.

FIG. 3n is an illustration of a screen 374 and a screen 376 displayable by the display device. FIG. 3o is an illustration of a screen 360, FIG. 3p is an illustration of a screen 366, and FIG. 3q is an illustration of a screen 370 displayable by the display device. FIGS. 3n, 3o, 3p, and 3q show an operation of hooks within the displayed periodical, as discussed further hereinabove in connection with FIG. 1. An embodiment of a technique for detecting hook definitions, and forming hyperlinks in response thereto, is discussed further hereinbelow in connection with FIG. 4.

FIG. 3n shows an example of such a hyperlink (within the displayed periodical) to a website. In the example of FIG. 3n, in response to the user clicking a region 378 within screen 374, the computer system displays screen 376 as indicated by arrow 380. Screen 376 is a website page that is associated with the hyperlink embedded within region 378. The website may be an advertiser's website or any other website specified in the hook definition by the publisher of the periodical. In this manner, a user efficiently navigates from a portion (e.g. region) of the periodical's likeness to a website associated with such portion. The portion may be an advertisement, as shown in the example of FIG. 3n, or may be any other type of content in the periodical.

FIGS. 3o, 3p, and 3q show an example of such a hyperlink (within the displayed periodical) to a media file. In the example of FIGS. 3o, 3p, and 3q, in response to the user clicking a region 362 within screen 360, the computer system reads a media file (associated with the hyperlink embedded within region 362) and displays visual frames in response thereto, including frames 364, 368 and 372. Frames 364, 368, and 372 may be displayed as successive still-frame images and/or continuous video images, according to the type of media file. Moreover, the media file may include audio information in addition to (or instead of) visual frames and, if so, the computer system outputs audio in response thereto.

In one example, the computer system reads the media file in response to a script. In such example, the script is associated with the hyperlink embedded within region 362, and the computer system initiates execution of the script in response to the user clicking region 362. In response to such a script, the computer system may (a) read any number or type of media files, in response to which the computer system displays and/or outputs visual frames and/or audio, (b) display a website or other content from the Internet, (c) prompt the user to specify additional information, and/or (d) read information from a computer-readable medium.

Figure 3R:
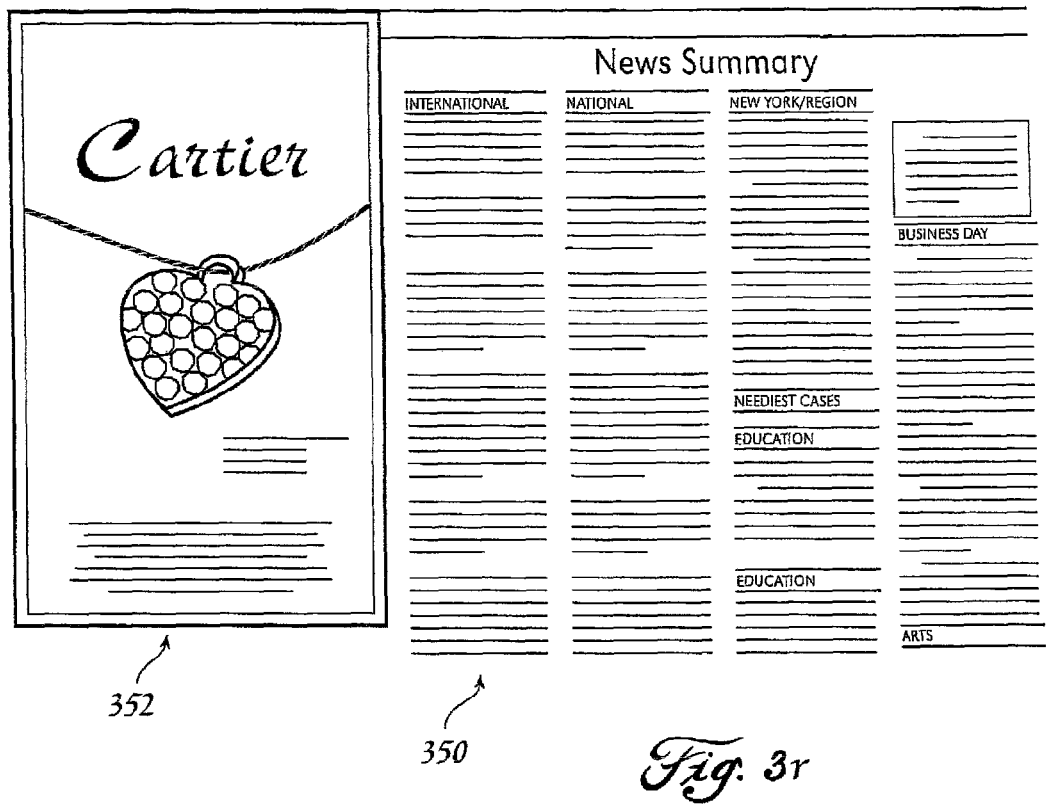
FIG. 3r is an illustration of a seventeenth screen displayable by a display device of the system of FIG. 1.
Figure 3S:
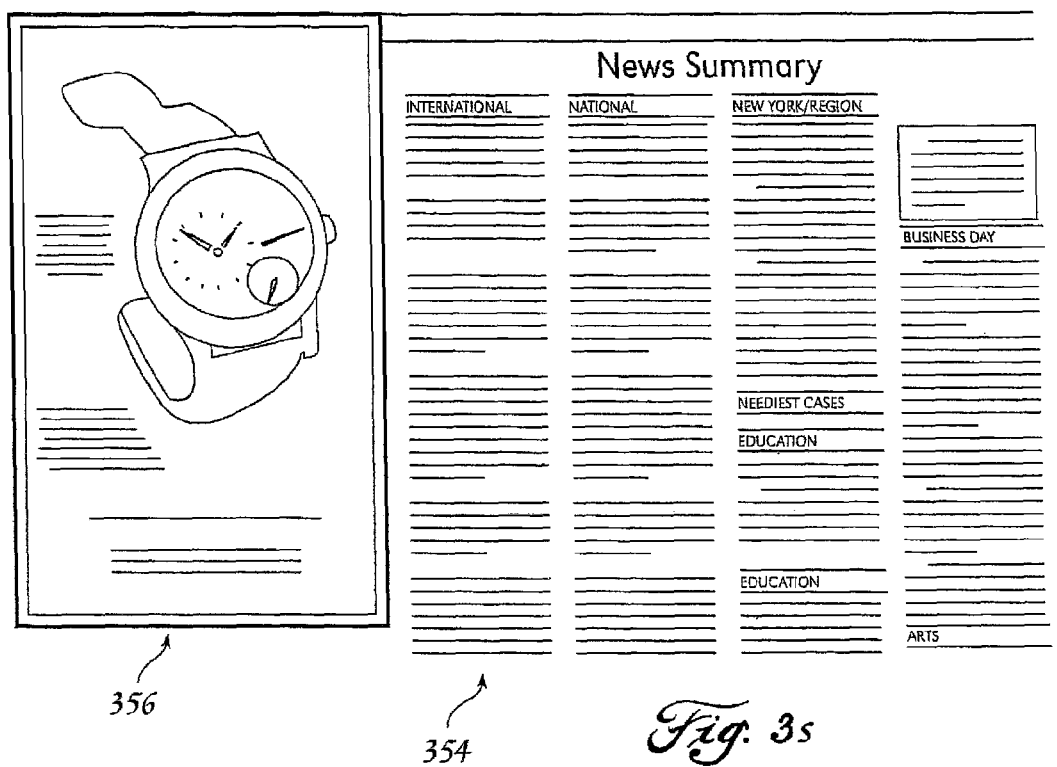
FIG. 3s is an illustration of a eighteenth screen displayable by a display device of the system of FIG. 1.

FIG. 3r is an illustration of a screen 350, and FIG. 3s is an illustration of a screen 354 displayable by the display device. FIGS. 3r and 3s show the selective insertion or replacement of content within the displayed likeness of the periodical. More specifically, FIGS. 3r and 3s show an example of targeted advertising, in which a portion of a page in the displayed likeness is customized (e.g. based on the user's demographic profile). The scope of the profile may be national, regional, or individual. Based on information of the profile, system 100 customizes the page, as for example by selectively inserting (within the page) an advertising message to a particular user or a group of users.

For example, the pages displayed in screens 350 and 354 are identical, except for advertisements 352 and 356 which appear in the upper left corner of screens 350 and 354, respectively. Advertisements 352 and 356 are useful for different users with different demographic profiles. Information in a demographic profile may be gathered from a variety of sources including the user, the user's computing device, and data gathering businesses or organizations. In response to such information, a publisher or advertiser is able to select advertisements (inserted within the displayed page) for different users or groups of users.

In one embodiment, publishers 102a, 102b and/or 102c insert a selected advertisement before or during transmission of a version to system 110. In another embodiment, system 110 inserts a selected advertisement in the course of translating the version of the periodical. In response to its programmed instructions, system 110 is operable to perform such insertion in response to information from the publisher or another source.

Although FIGS. 3r and 3s show an example of replacing advertisements in a version of a periodical, other portions of the version may likewise be replaced. For example, for a periodical with a national scope, system 110 may insert regionally oriented content for a select group of users by replacing certain nationally oriented content. Such replacement may occur anywhere in the likeness.

Figure 3T:
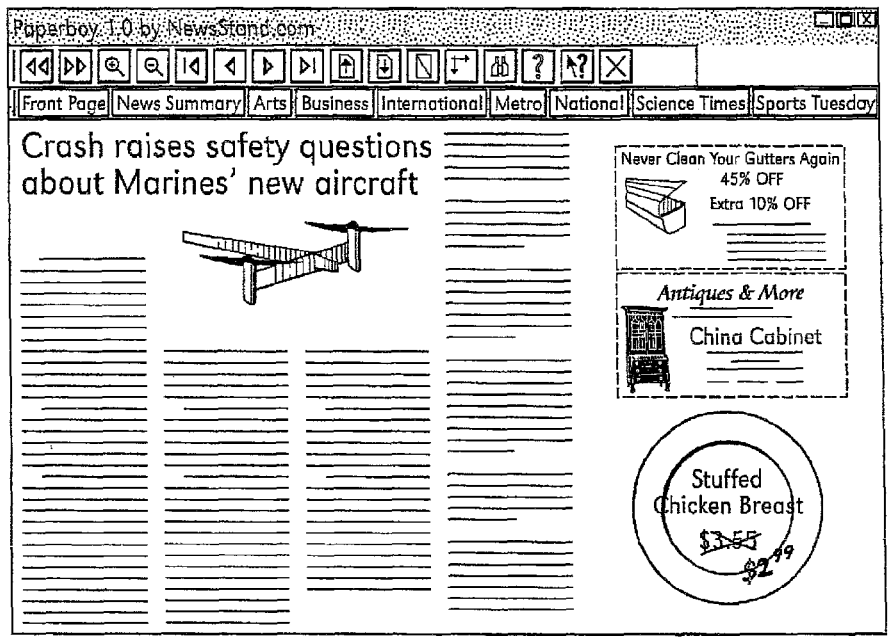
FIG. 3t is an illustration of a nineteenth screen displayable by a display device of the system of FIG. 1.
Figure 3U:
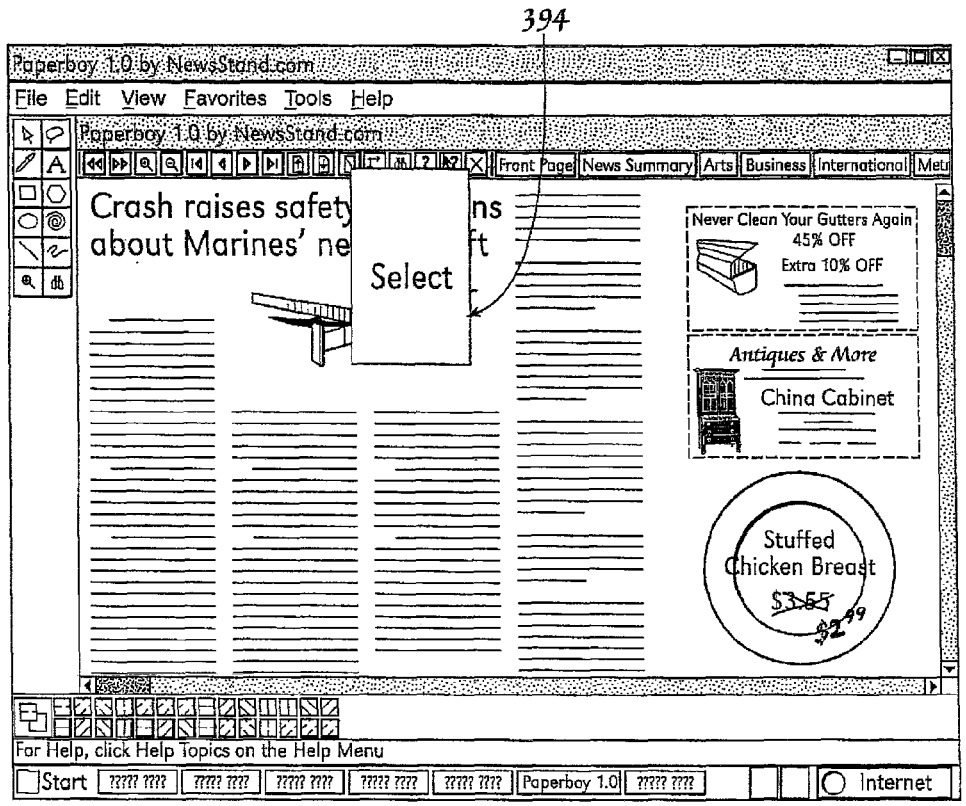
FIG. 3u is an illustration of a twentieth screen displayable by a display device of the system of FIG. 1.
Figure 3V:
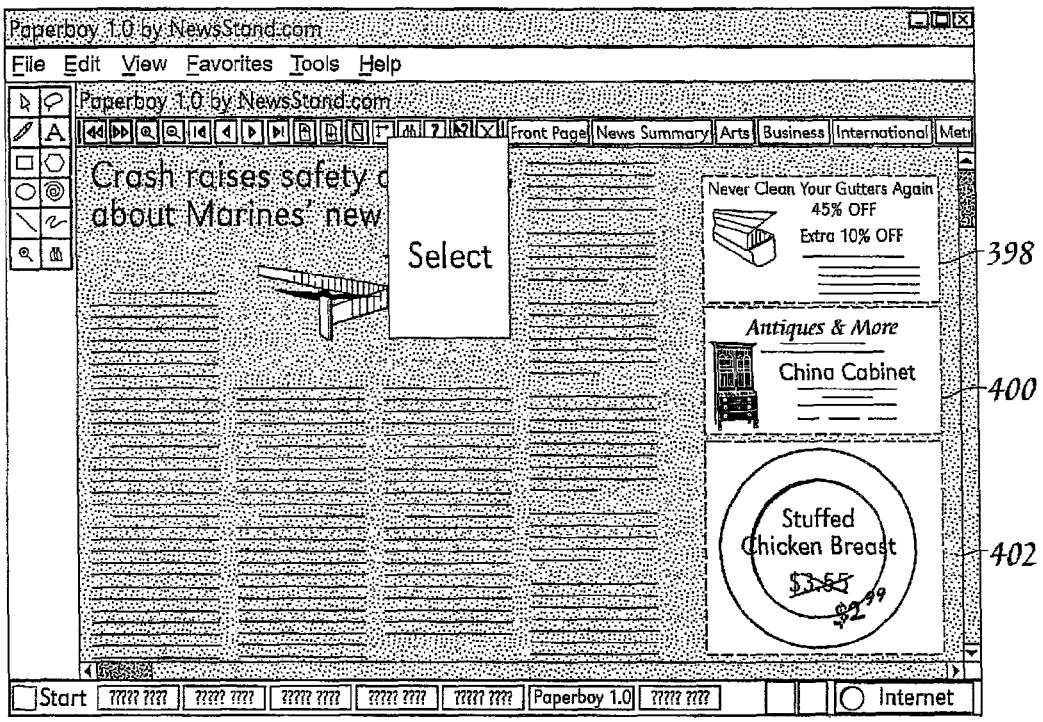
FIG. 3v is an illustration of a twenty-first screen displayable by a display device of the system of FIG. 1.
Figure 3W:
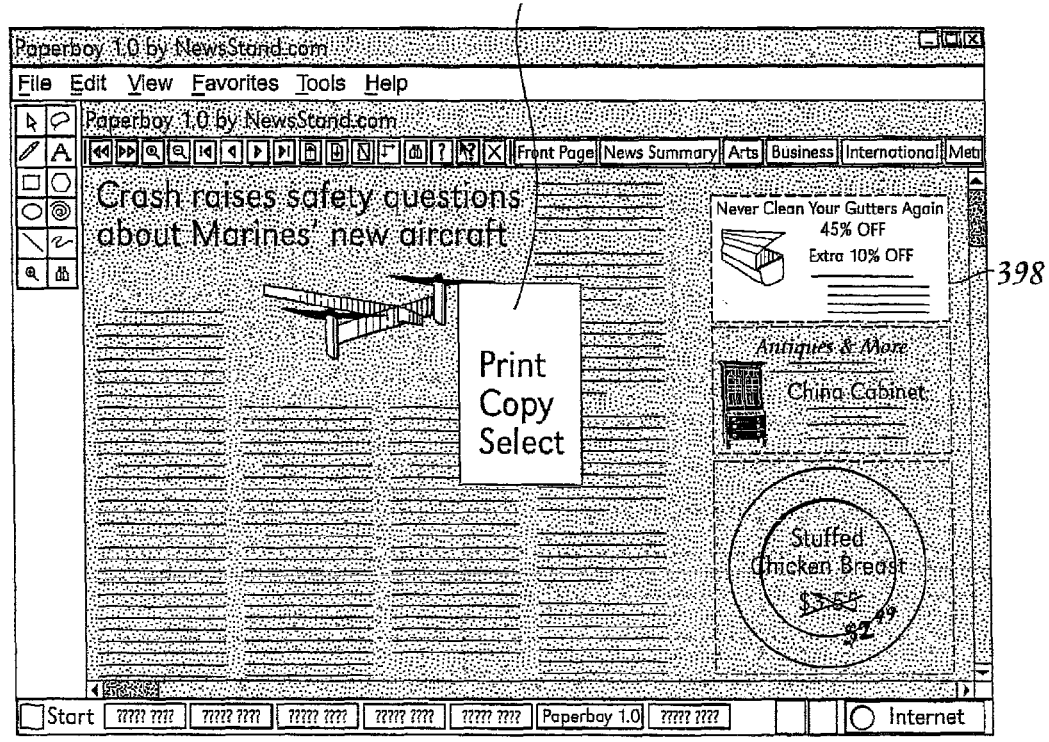
FIG. 3w is an illustration of a twenty-second screen displayable by a display device of the system of FIG. 1.
Figure 3X:
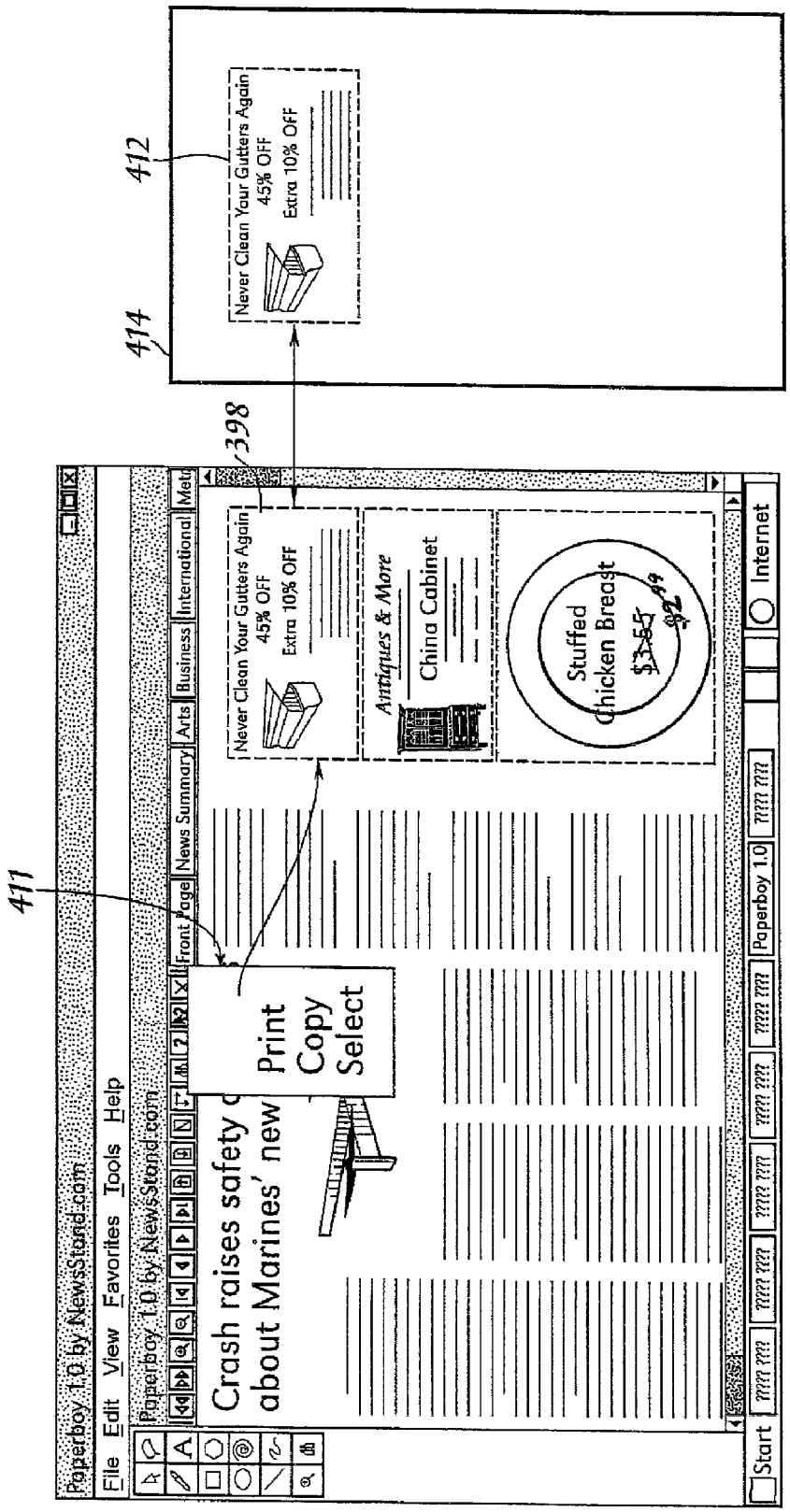
FIG. 3x is an illustration of a twenty-third screen displayable by a display device of the system of FIG. 1.

FIG. 3t is an illustration of a screen 390, FIG. 3u is an illustration of a screen 392, FIG. 3v is an illustration of a screen 396, FIG. 3w is an illustration of a screen 404, and FIG. 3x is an illustration of a screen 408 displayable by the display device. As shown in FIGS. 3t, 3u, 3v, 3w, and 3x, predetermined portions of the displayed likeness are selectable by the user for performing operations such as copying, pasting, printing, or storing.

Publishers of periodicals may be concerned about possible unauthorized use of content in the periodicals. Accordingly, publishers may wish to prevent all or specified portions of the translated versions of periodicals from being copied, pasted, printed, or stored by users. Publishers may also wish to permit all or specified portions of the translated versions to be selectable by users for copying, pasting, printing, or storing. For example, publishers may wish to permit users to perform such operations on crossword puzzles, coupons, or other specified portions.

Referring to FIG. 3t, the user is able to operate the pointing device for determining which portions, if any, of screen 390 may be copied, pasted, printed, or stored. As shown in FIG. 3u, in response to the user activating a switch (e.g. a right mouse button) on the pointing device, the user's associated computing device displays a menu 394, which shows a "Select" option for the user to highlight user-selectable (for copying, pasting, printing, or storing) portions of the displayed likeness. In response to the user clicking on the "Select" option, the computing device displays screen 396 of FIG. 3v.

In screen 396, portions 398, 400, and 402 (the highlighted portions) are selectable by the user for copying, pasting, printing, or storing. Accordingly, the user may select one of these highlighted portions by clicking on it, as shown in screen 404 of FIG. 3w in which the user has clicked portion 398 (the highlighted portion). After selecting a highlighted portion (e.g. portion 398 in FIG. 3w), the user may cause the computing device to display a menu 411, which allows the user to select an operation for the computing device to perform on the selected portion.

For example, by clicking a "Print" option of menu 411 as shown in FIG. 3x, the user commands the computing device to print a hardcopy of selected portion 398, as shown by a copy 412 of the selection portion appearing on a printed page 414. By clicking a "Copy" option of menu 411, the user commands the computing device to copy selected portion 398 into the computing device's memory. After such copying, the user is able to click a "Paste" option while viewing a different file or document, so that the computing device pastes the copied selected portion 398 into the different file or document. By clicking another suitable option, the user commands the computing device to store selected portion 398 in a computer-readable medium (e.g. a virtual file cabinet portion of a computer-readable medium), which may store multiple selected portions for subsequent access by the user.

FIG. 3y is an illustration of a menu box 420 displayable by the display device. As shown in FIG. 3y, the user is able to command the computing device to search one or more periodicals. As discussed further hereinbelow, the search may include periodicals that are either received by the user's associated computing device or stored on a remote server. As shown in FIG. 3y, the user may enter (e.g. by typing with the keyboard) a term (e.g. "fishing") in box 422, so that the computing device searches the periodicals for occurrences of such term. As shown in FIG. 3y, the computing device displays the search results in box 424 as a list of indicators, which include the page, the issue, and the periodical name for each occurrence. In response to the user selecting (e.g. by clicking) one of the results in box 424, the computing device displays the content of the selected result. A user may display one of the results by selecting its corresponding indicator in box 424.

Figure 3Z:
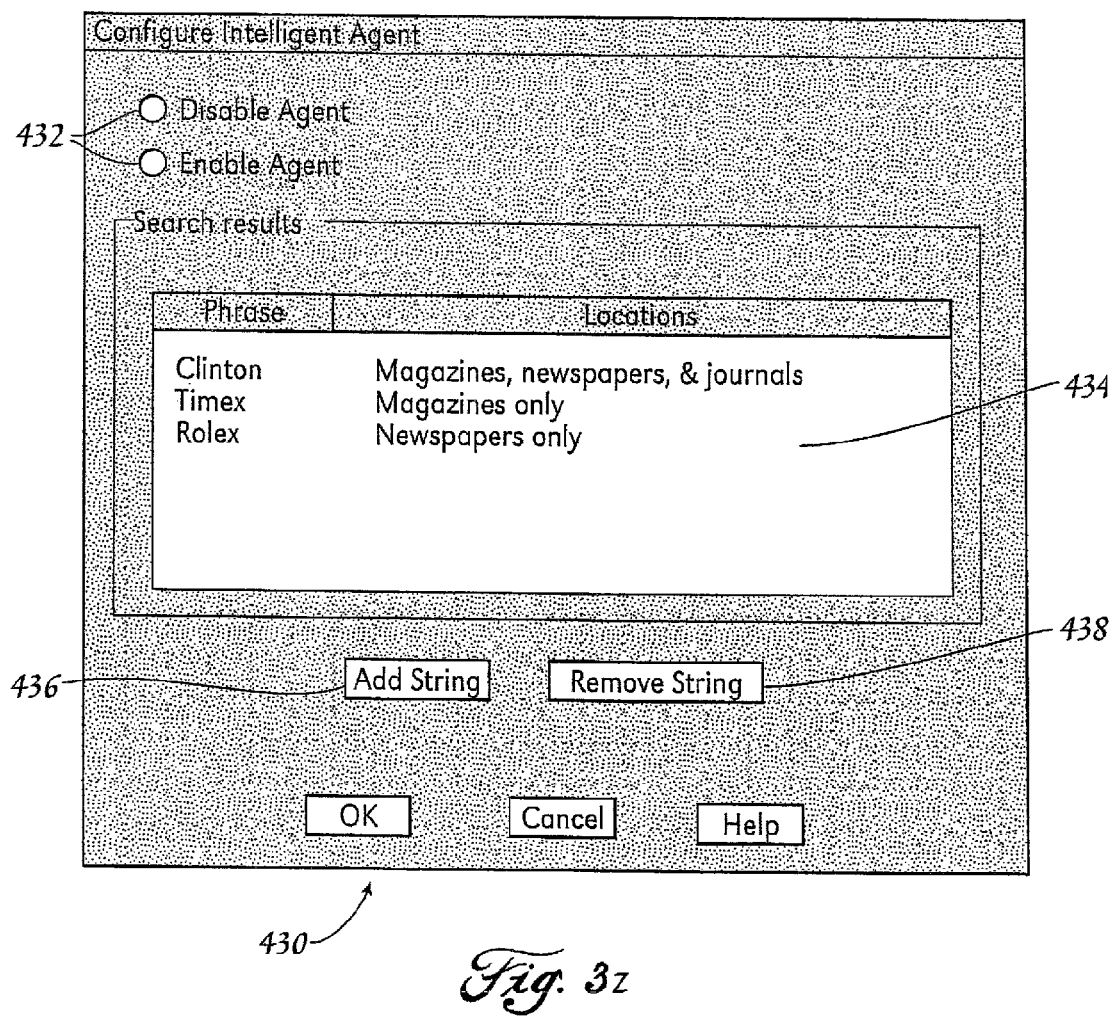
FIG. 3z is an illustration of a third menu box displayable by a display device of the system of FIG. 1.
Figure 3A:
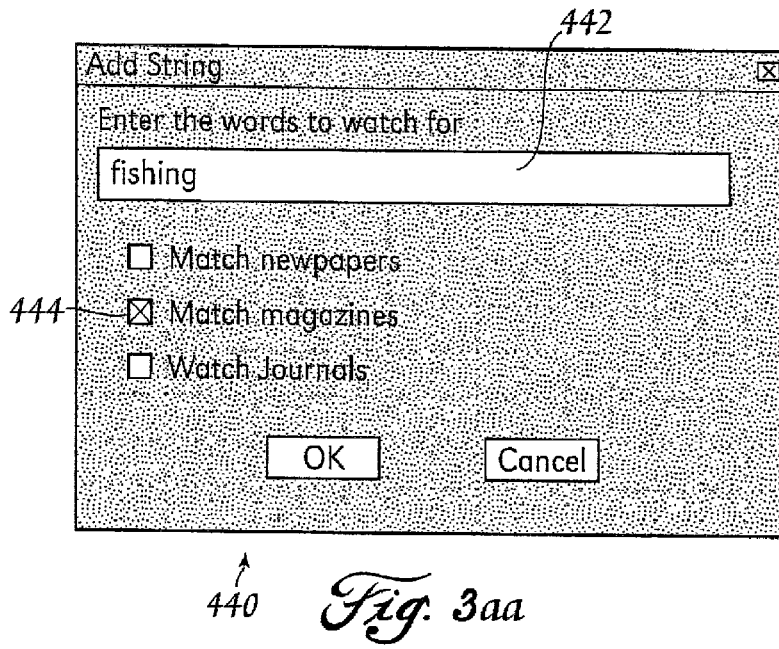
Figure 3B:
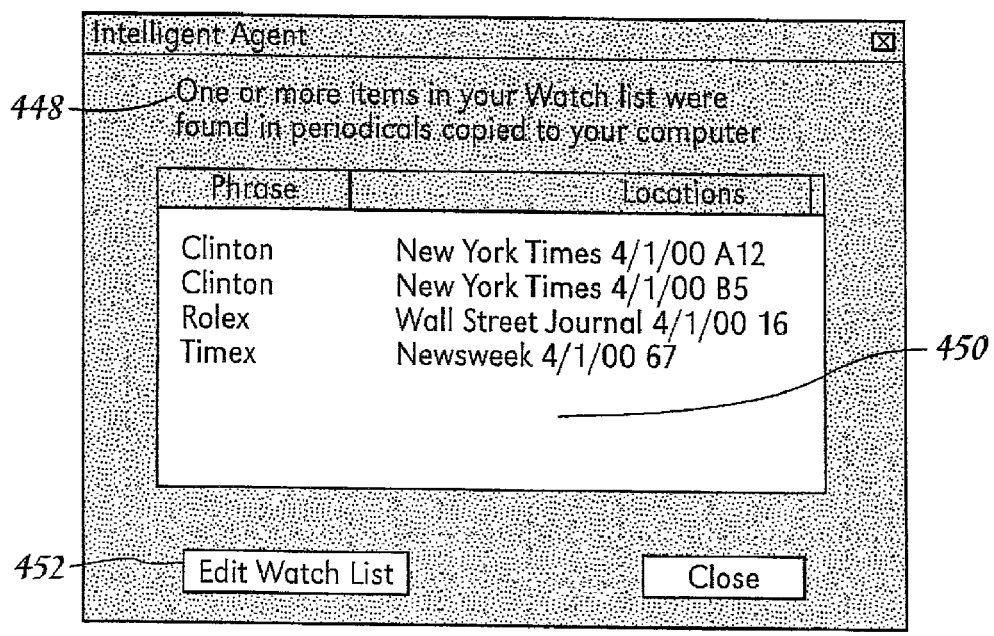

FIG. 3z is an illustration of a menu box 430, FIG. 3aa is an illustration of a menu box 440, and FIG. 3bb is an illustration of a menu box 446 displayable by the display device. As shown in FIGS. 3z, 3aa, and 3bb, the user is able to specify one or more "watch list" terms for intelligent agent software of system 100 to automatically identify in searching periodicals. For example, the user may want to know whether periodicals include the specified "watch list" terms, but without requiring the user to repetitively specify such terms and repetitively initiate the search on multiple dates (e.g. each date when the user's computer system receives a new version of a periodical). As shown in FIGS. 3z, 3aa, and 3bb, the user may specify "watch list" terms on a single date, so that such terms are thereafter automatically searched and identified by intelligent agent software of system 100 in response to received periodicals.

With menu box 430 of FIG. 3z, the user is able to selectively enable or disable the intelligent agent software by clicking a suitable one of indicators 432. After enabling the intelligent agent software, the user may select "Add String" button 436 or "Remove String" button 438 to selectively add or remove available "watch list" terms for the intelligent agent software to search. As shown in FIG. 3z, the selected "watch list" terms appear in box 434, along with their respectively associated types of periodicals for the intelligent agent software to search.

As shown in FIG. 3aa, menu box 442 allows the user to specify a "watch list" term (e.g. by typing with the keyboard), along with its respectively associated one or more types of periodicals for the intelligent agent software to search. In the example of FIG. 3aa, the types of periodicals include newspapers, magazines, and journals. As shown in the example of FIG. 3aa, the user has specified "fishing" as a "watch list" term and has selected "newspapers" as the respectively associated type of periodical to be searched for such term by the intelligent agent software.

After the intelligent agent software performs a search, the user's associated computing device displays the results in a results box 446, as shown in FIG. 3bb. Results box 446 includes a message 448, which indicates whether any "watch list" term was identified by the search. Also results box 448 includes a box 450 which lists any identified "watch list" terms, along with their respectively associated locations in the periodicals. In response to the user selecting (e.g. by clicking) one of the listings in box 450, the computing device displays the selected term within other content of its respectively associated location (in the displayed likeness of the periodical).

Figure 4:
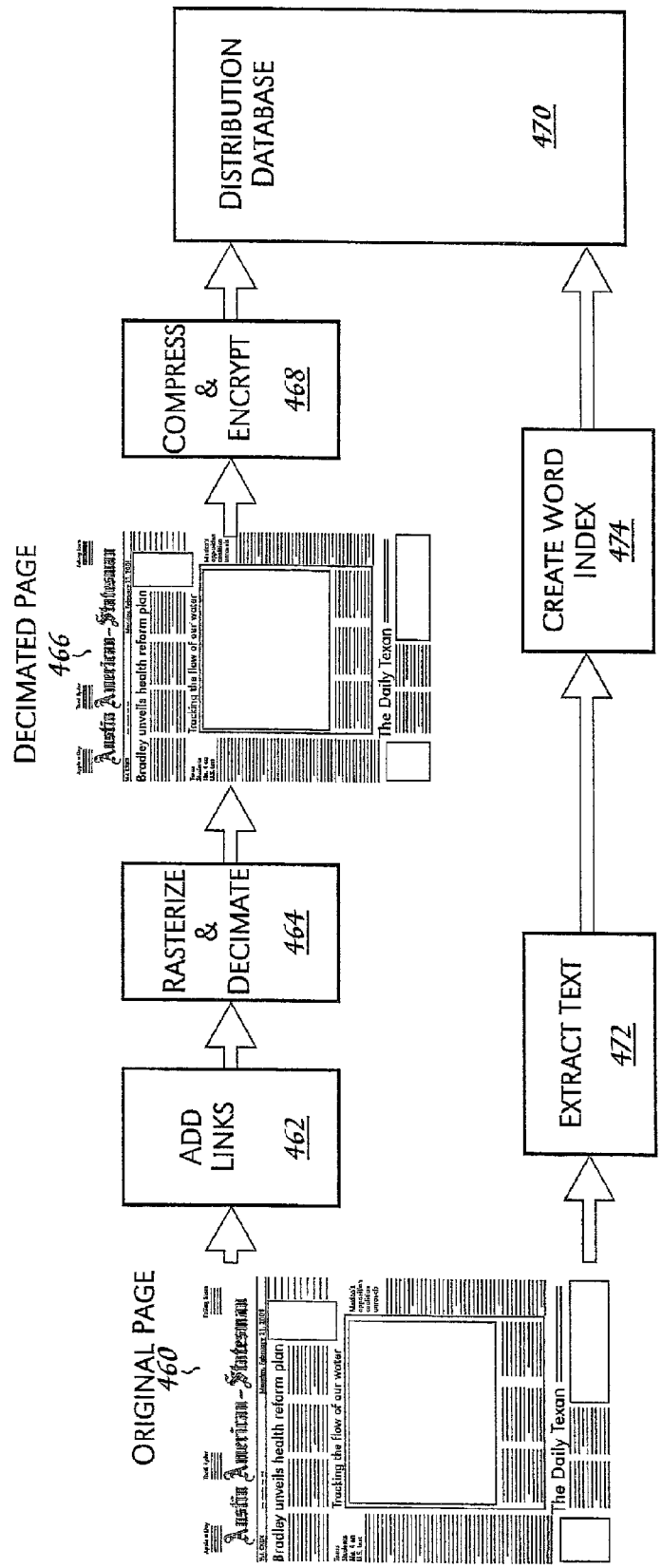
FIG. 4 is an illustration of an embodiment of an operation performed by the system of FIG. 1 for translating a digital version of a mass-produced printed paper.

FIG. 4 is an illustration of an embodiment of an operation performed by system 110 (e.g. by content preparation system 114) for translating a digital version of a mass-produced printed paper. In the operation of FIG. 4, system 110 translates a version of a mass-produced printed paper from a first format provided by the content publisher system (e.g. 102a, 102b, or 102c of FIG. 1) into a second format suitable for processing by a consumer's computing device. As shown in FIG. 4, system 110 stores the translated version in distribution database 470, which is accessible through a communications network (e.g. network 120 of FIG. 1).

The operation illustrated in FIG. 4 includes two separate paths, both of which are performed by system 110. In a first path, as indicated in a step 462, system 110 forms hyperlinks within an original page 460. More particularly, system 110 detects hooks to external information (e.g. files, scripts, or websites) associated with the version received by system 110 from the content publisher system. A hook (e.g. reference) is a pointer to external information, and the hook identifies a portion of original page 460 that is associated with such external information.

In the illustrative embodiment, if the external information is an associated file or script, system 110 outputs the external information (within the translated version) to customers (e.g. 132, 134, 136) through network 120. Within the translated version, the hooks are stored in a table as hook definitions, so that they are detectable by customers (e.g. 132, 134, 136). In displaying the likeness of a mass-produced printed paper, such customers display highlighted hyperlinks that are associated with such hooks.

In the operation 462 of forming hyperlinks, system 114 is operable to replace a portion of the version (received by system 112 from a content publisher system) with other content (e.g. based on the user's demographic profile), as discussed further hereinabove in connection with FIG. 1. For example, in response to its programmed instructions, system 114 is operable to replace one advertisement or article (e.g. in a portion of original page 460) with another advertisement or article, as discussed further hereinabove in connection with FIGS. 3r and 3s.

In one example, such replacement occurs for some users having a particular profile, but does not occur for other users having a different profile. The information in a profile may include traditional demographic information such as sex, age, and residence and may also include commercial information such as shopping patterns, buying preferences, or user interests. System 110 is operable to receive such commercial information from e-commerce websites or other information gathering organizations.

As described hereinabove in connection with FIGS. 3t, 3u, 3v, 3w, and 3x, predetermined portions of the displayed likeness are selectable by the user for performing operations such as copying, pasting, printing, or storing. Accordingly, publishers (e.g. 102a, 102b, or 102c of FIG. 1) may wish to prevent all or specified portions of the original page 460 from being copied, pasted, printed, or stored by users. Publishers may also wish to permit all or specified portions of the original page 460 to be selectable by users for copying, pasting, printing, or storing. In step 462, system 110 identifies such portions as specified by the publisher, and system 110 forms information within original page 460, so that the user's computing device detects such portions and permits the user to select such portions for copying, pasting, printing, or storing.

Also, in the first path, as indicated in a step 464, system 110 rasterizes and decimates original page 460. In that manner, system 110 forms a rasterized version of original page 460 and stores the rasterized version as a bitmap, .gif, or .jpeg file. In the space above the masthead, original page 460 includes information regarding its format and layout. For example, system 110 detects the presence of a Pantone or gray-scale bar (indicating whether the page is a color page or a black and white one) and the presence of registration marks (e.g. marks that delineate the top, bottom, left, and right margins). System 110 saves color pages as 256-bit color images and black and white pages as smaller monochrome images. In comparison to original page 460, the rasterized version of original page 460 may be significantly smaller in size.

After rasterizing original page 460, system 110 decimates the rasterized version to form a decimated page 466. In that manner, system 110 physically reduces the rasterized version in size, so that decimated page 466 is suitable for display on a user's computing device. Further, system 110 compresses and encrypts decimated page 466, as indicated in a step 468.

System 110 stores the compressed and encrypted version ("translated version") of decimated page 466 in a distribution database 470. In view of the compression, such version is more readily transferred by system 110 through network 120. In view of the encryption, system 110 is operable to transfer such version through an unsecure portion of network 120 in a manner that controls legible access to such version's content in response to a key.

In a second path of the operation illustrated in FIG. 4, as indicated in a step 472, system 110 identifies terms from original page 460 and stores them in a file. Within the file, system 110 identifies and removes non-distinctive terms (e.g. pronouns and conjunctions). In response to the remaining terms in the file, system 110 creates an index that correlates such terms to their respective associated locations in the translated version, as indicated in a step 474. In response to the index, system 110 forms hyperlinks within the translated version, so that terms are linked (through the hyperlinks) to their respective associated locations in pages of the translated version, as discussed further hereinbelow in connection with FIG. 6.

System 110 references such locations in the form of an approximated Cartesian (X,Y) coordinate address within the translated version, in which the numeric variable X identifies a particular row of pixels and the numeric variable Y identifies a particular column of pixels. In response to the index, the user's computing device performs searches for occurrences of user-specified terms, as described further hereinabove in connection with FIG. 3y. Also, system 110 incorporates the translated version's index into an aggregate index. In response to the aggregate index, system 110 perform searches for occurrences of terms in current and archived versions of mass-produced printed papers.

FIG. 5 is a diagram of an embodiment of a format for storing the translated version on a computer-readable medium. The translated version includes a header 500, a page map 502, a link map 504, an index 506, rasterized pages 508, and external media 510.

Header 500 includes information about the content of the translated version, such as the title, the issue date, and the number of rasterized pages 508. Page map 502 includes file names of rasterized pages 508 and of external media 510. Link map 504 includes a table of hyperlinks for the translated version. Index 506 includes terms and pointer lists for the translated version, as discussed further hereinabove in connection with FIG. 4. Rasterized pages 508 include a rasterized page file per page of the mass-produced printed paper. External media 510 includes external media files that are referenced by hooks.

A user's associated computer system receives the translated version in the format of FIG. 5. In response to user-specified selections, content delivery system 116 is operable to permit a particular customer to receive and display (for viewing by the user) only specified sections of the mass-produced printed paper. For example, the user may wish to receive and view only the business section and the sports section of the New York Times. In response to the user-specified selections, content delivery system 116 permits the particular customer to receive and display (for viewing by the user) the specified sections' respectively associated rasterized pages (of rasterized page 508) as separate files, so that rasterized pages of other sections are not received and displayed by the particular customer.

By receiving and displaying rasterized pages 508 as separate files, users achieve various advantages, even if such users wish to receive and view all sections of the mass-produced printed paper. For example, it may be more efficient for the user's associated computer system to receive and display several small files instead of one large file. Moreover, with such a technique, system 100 is more readily implemented with a ZMODEM-like restart procedure to recover from an interrupted transmission. Also, such a technique more readily permits sale and distribution of sections (of the mass-produced printed paper) individually, instead of mandating a sale and distribution of the entire mass-produced printed paper.

Figure 6:
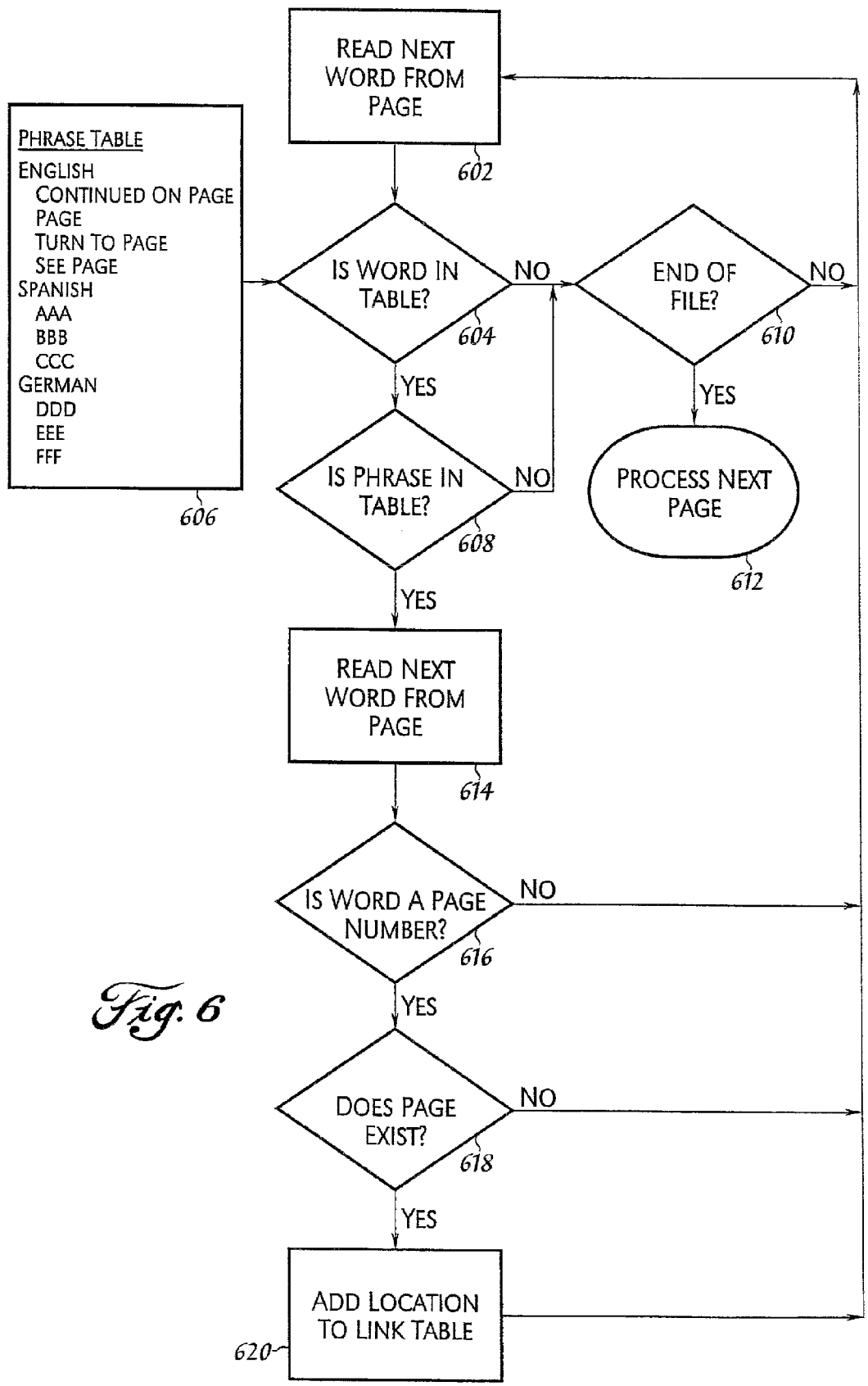
FIG. 6 is a flowchart of an embodiment of an operation performed by the system of FIG. 1 for forming hyperlinks within a digital version of a mass-produced printed paper.
Figure 7B:
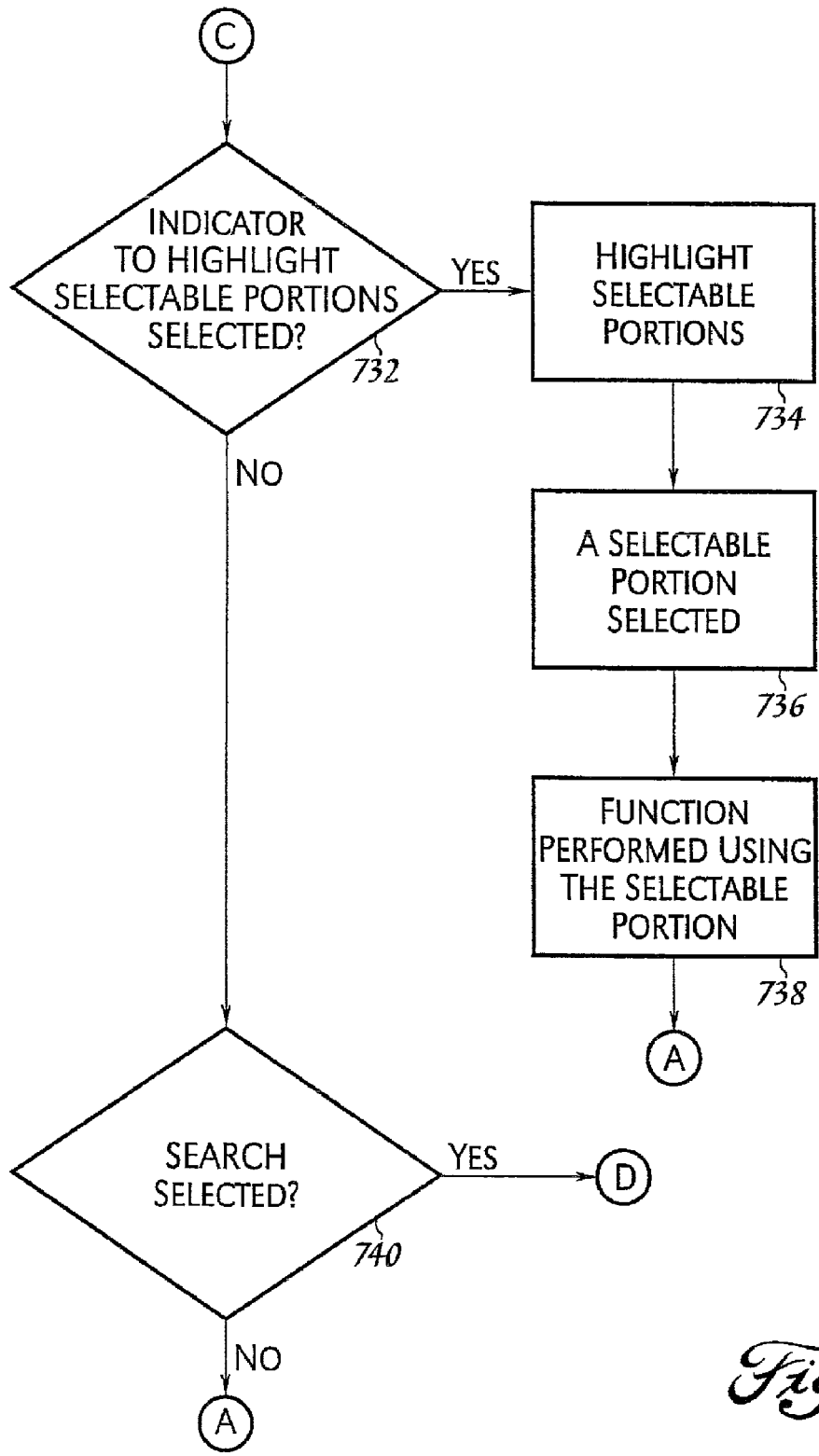
Figure 7C:
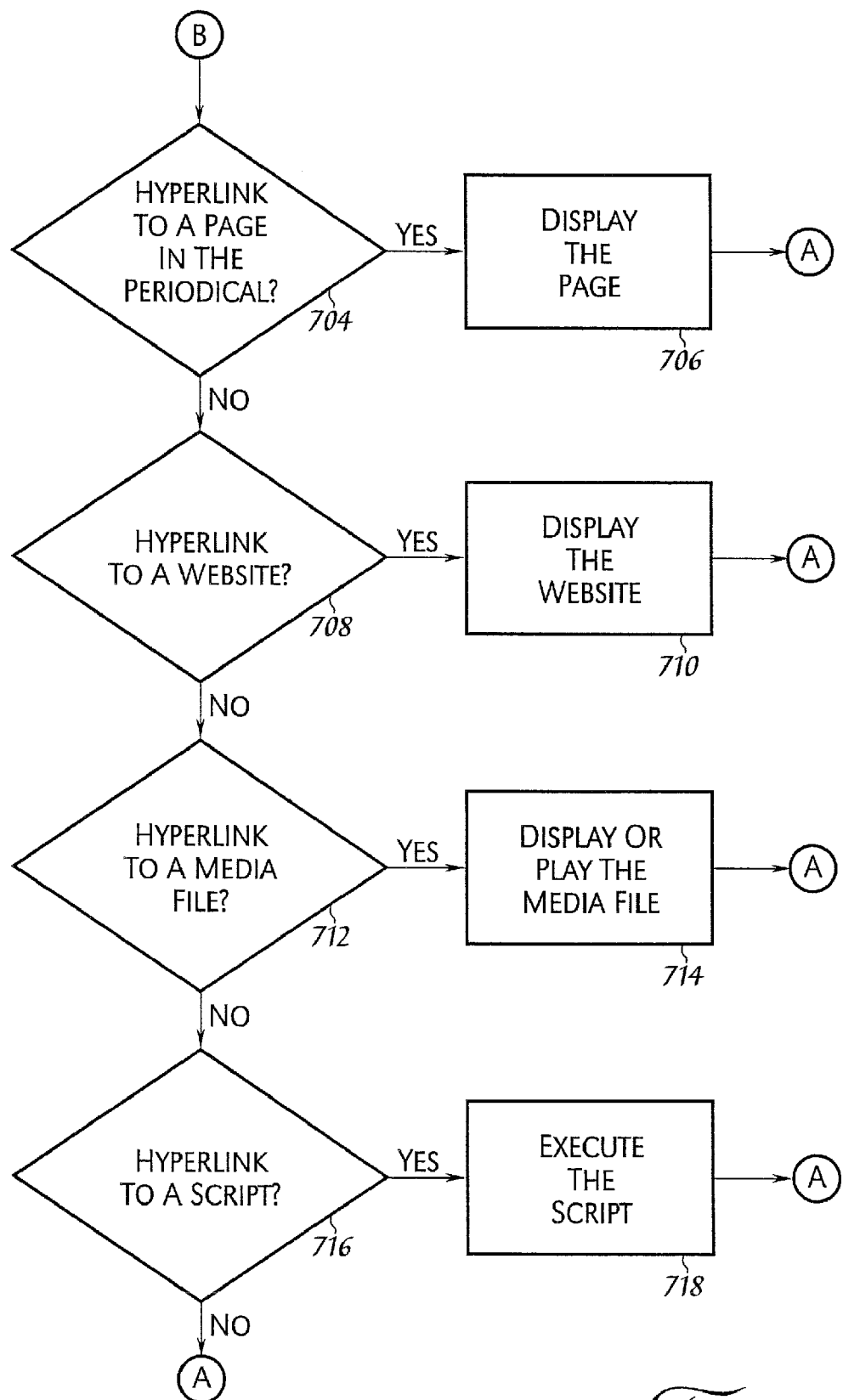
Figure 7D:
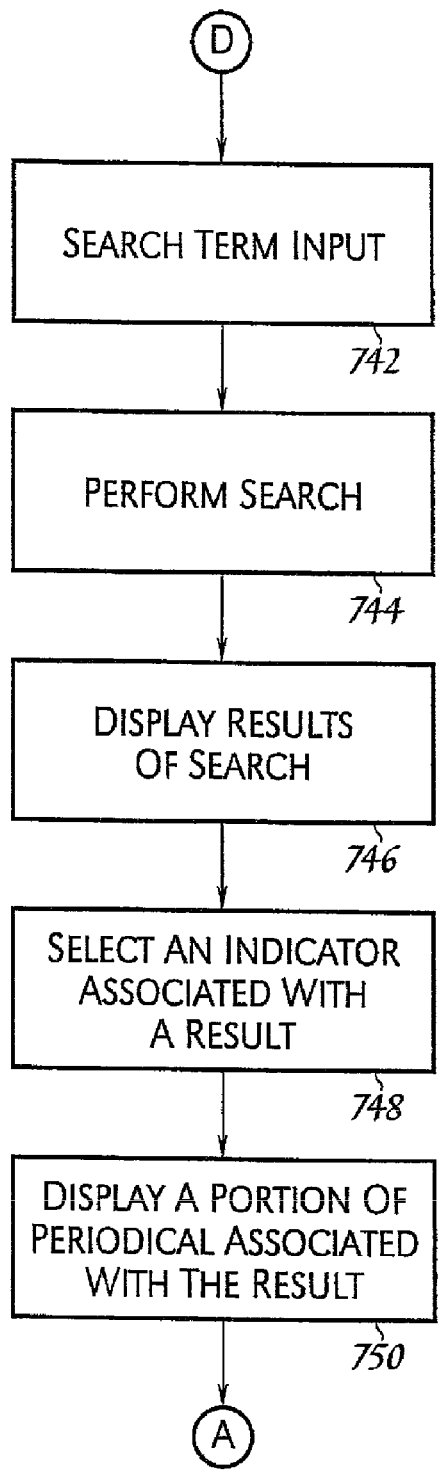

FIG. 6 is a flowchart of an embodiment of an operation performed by system 110 for forming hyperlinks within the translated version. As described further hereinabove in connection with FIG. 3*l*, in many mass-produced printed periodicals, articles begin on one page of the periodical and continue to one or more other pages. A portion of an article may include a term or a phrase that indicates the location of another portion of the article. Examples of such terms or phrases are "continued on page _," "see story on page _," or simply "page _."

FIG. 6 describes an operation performed by system 110 for forming hyperlinks between pages of the translated version of such a periodical. In that manner, by selectively clicking the hyperlinks (formed and embedded by system 110 within the translated version that is displayed by the user's associated computing device), the user is able to more efficiently navigate within the displayed likeness of the periodical. As shown in FIG. 3*l*, such hyperlinks 340 are displayed by the computing device within the likeness of the periodical.

The operation begins at a step 602, at which system 110 reads a next word from a page. At a next step 604, system 110 determines whether the word appears in a phrase table 606. Phrase table 606 includes various phrases that indicate continuation of an article to another page. These phrases may be in a variety of languages, as indicated in FIG. 6.

In step 604, if the word does not appear in phrase table 606, the operation continues to a step 610. At step 610, system 110 determines whether the end of the page has been reached. If the end of the page has not been reached, then the operation returns to step 602. If the end of the page has been reached, the operation continues to a step 612, at which system 110 initiates processing a next page (if any) and returns to step 602.

Referring again to step 604, if the word appears in phrase table 606, the operation continues to a step 608. At step 608, system 110 determines whether the word is part of a phrase in the page, and whether such phrase appears in phrase table 606. If such a phrase does not appear in phrase table 606, the operation continues to step 610. If such a phrase appears in phrase table 606, the operation continues to a step 614, at which system 110 reads a next word from the page.

After step 614, the operation continues to a step 616, at which system 110 determines whether such next word is a page number. If such next word is not a page number, the operation returns to step 602. If such next word is a page number, the operation continues to a step 618, at which system 110 determines whether such page number is associated with an existing page.

If such page number is not associated with an existing page, the operation returns to step 602. If such page number is associated with an existing page, the operation continues to a step 620, at which system 110 adds such page number and a location of such phrase (i.e. the phrase that precedes such page number within the current page) to a link table. In response to the link table, system 110 forms a hyperlink within the translated version, so that the location of such phrase (within the current page) is linked to the other existing page that is associated with such page number.

FIGS. 7*a*, 7*b*, 7*c*, and 7*d* are a flowchart of an embodiment of operations performed by a customer (e.g. 132, 134, 136) for performing various functions within the translated version. The operation begins at a step 702, at which the customer determines whether its associated user has selected an indicator associated with a hyperlink. If so, the operation continues to a step 704.

At step 704, the customer determines whether the hyperlink points to a page in the mass-produced printed paper. If so, the operation continues to a step 706, at which the customer displays the page for viewing by the user. FIG. 3*l* is an illustration of such a function. After step 706, the operation returns to step 702.

Referring again to step 704, if the hyperlink does not point to a page in the mass-produced printed paper, the operation continues to a step 708. At step 708, the customer determines whether the hyperlink points to a website. If so, the operation continues to a step 710, at which the customer displays the website for viewing by the user. FIGS. 3*l* and 3*m* are illustrations of such a function. After step 710, the operation returns to step 702.

Referring again to step 708, if the hyperlink does not point to a website, the operation continues to a step 712. At step 712, the customer determines whether the hyperlink points to a media file. If so, the operation continues to a step 714, at which the customer displays or plays the media file, according to the type of media file. FIGS. 3*o*, 3*p*, and 3*q* are illustrations of such a function. After step 714, the operation returns to step 702.

Referring again to step 712, if the hyperlink does not point to a media file, the operation continues to a step 716. At step 716, the customer determines whether the hyperlink points to a script. If so, the operation continues to a step 718, at which the customer executes the script. After step 718, the operation returns to step 702. Referring again to step 716, if the hyperlink does not point to a script, the operation returns to step 702.

Referring again to step 702, if the customer determines that the user has not selected an indicator associated with a hyperlink, the operation continues to a step 720. At step 720, the customer determines whether the user has selected an indicator associated with a section in the mass-produced printed paper. If so, the operation continues to a step 722, at which the customer displays the section for viewing by the user. FIG. 3*k* is an illustration of such indicators (buttons 330). After step 722, the operation returns to step 702.

Referring again to step 720, if the customer determines that the user has not selected an indicator associated with a section in the mass-produced printed paper, the operation continues to a step 724. At step 724, the customer determines whether the user has selected a zoom function, such as magnification (zoom in) or demagnification (zoom out) of a displayed portion of the mass-produced printed paper. If so, the operation continues to a step 726, at which the customer performs the zoom function. FIGS. 3*h*, 3*i*, and 3*j* are illustrations of such a function. After step 726, the operation returns to step 702.

Referring again to step 724, if the customer determines that the user has not selected a zoom function, the operation continues to a step 728. At step 728, the customer determines whether the user has selected a pan function. If so, the operation continues to a step 730, at which the customer performs the pan function. FIGS. 3*f* and 3*g* are illustrations of such a function. After step 730, the operation returns to step 702.

Referring again to step 728, if the customer determines that the user has not selected a pan function, the operation continues to a step 732. At step 732, the customer determines whether the user has selected an indicator to highlight selectable portions of the mass-produced printed paper. If so, the operation continues to a step 734, at which the customer highlights the selectable portions for viewing by the user. After step 734, the operation continues to a step 736.

At step 736, the operation self-loops until the user has selected a selectable portion. After step 736, the operation continues to a step 738, at which the customer performs a user-specified function on the user-selected portion. FIGS. 3t, 3u, 3v, 3w, and 3x are illustrations of such functions of steps 732, 734, 736 and 738. After step 738, the operation returns to step 702.

Referring again to step 732, if the user has not selected an indicator to highlight selectable portions of the mass-produced printed paper, the operation continues to a step 740. At step 740, the customer determines whether the user has selected a search. If not, the operation returns to step 702. Conversely, if the user has selected a search, the operation continues to a step 742, at which the customer receives a search term from the user.

After step 742, the operation continues to a step 744, at which the customer performs the search. After step 744, the operation continues to a step 746, at which the customer displays results of the search for viewing by the user. After step 746, the operation continues to a step 748.

At step 748, the operation self-loops until the user has selected an indicator associated with a particular search result. After step 748, the operation continues to a step 750, at which the customer displays a portion of the mass-produced printed paper (associated with the particular search result) for viewing by the user, in response to the user's selection of the indicator. FIG. 3y is an illustration of menu box 420 for the user to select a search. After step 750, the operation returns to step 702.

In addition to the functions of FIGS. 7a, 7b, 7c and 7d, the customer performs other functions. Moreover, the functions of FIGS. 7a, 7b, 7c and 7d are subject to chronological reordering, and the customer may perform them independently of one another in any order or concurrently.

Figure 8A:
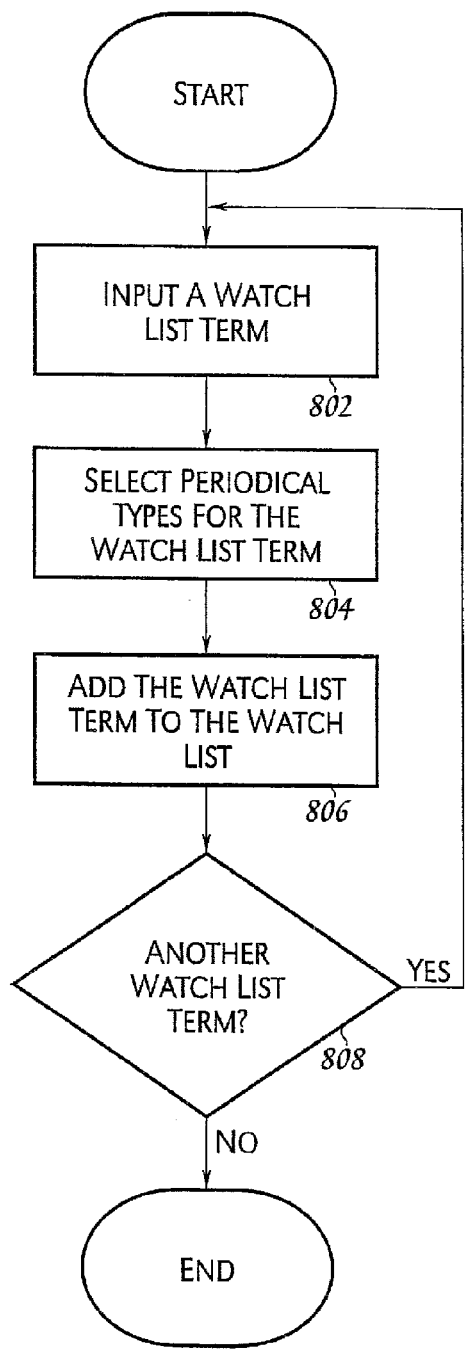
FIG. 8a is a flowchart of an embodiment of an operation performed by the system of FIG. 1 for creating a list of watch list terms.

FIG. 8a is a flowchart of an embodiment of an operation performed by the customer for creating a list of watch list terms. The operation begins at a step 802, at which the customer receives (from its associated user) a watch list term. At a next step 804, the customer receives (from the user) a selection of mass-produced printed paper types for the watch list term.

At a next step 806, the customer adds the watch list term to a watch list. At a next step 808, the customer determines whether the user has specified another watch list term. If so, the operation returns to step 802. Conversely, if the user has not specified another watch list term, the operation ends. FIGS. 3z and 3aa are illustrations of menu boxes 430 and 440 for the user to specify one or more watch list terms.

Figure 8B:
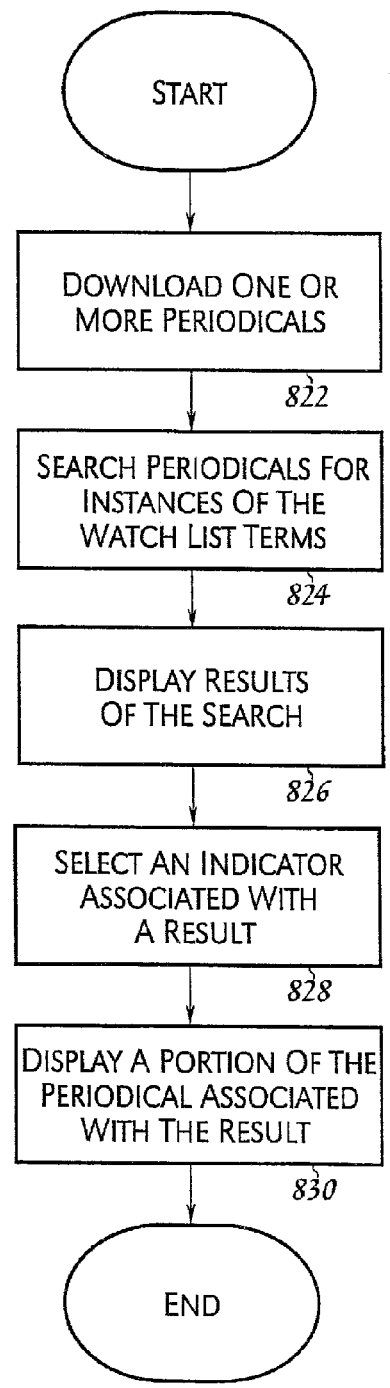
FIG. 8b is a flowchart of an embodiment of an operation performed by the system of FIG. 1 for searching a digital version of a mass-produced printed paper in response to a list of watch list terms.

FIG. 8b is a flowchart of an embodiment of an operation performed by the customer for searching mass-produced printed papers in response to the list of watch list terms. The operation begins at a step 822, at which the customer receives one or more mass-produced printed papers from system 110. At a next step 824, the customer searches the received papers for occurrences of the watch list terms. In one embodiment, this search may include searching for the watch list terms in an index. In other embodiments, this search may be performed in other ways.

At a next step 826, the customer displays results of the search for viewing by the user. At a next step 828, the operation self-loops until the user selects an indicator associated with a particular search result. At a next step 830, the customer displays a portion of the mass-produced printed paper (associated with the particular search result) for viewing by the user, in response to the user's selection of the indicator.

After step 830, the operation ends. FIG. 3bb is an illustration of results box 446 for the user to view and select results of the search.

Referring again to FIG. 2, computer-readable medium 212 is a floppy diskette. Computer-readable medium 212 and computer 204 are structurally and functionally interrelated with one another as discussed further hereinbelow. Each computing device of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to computer-readable medium 214.

Computer-readable medium 212 stores (or encodes, or records, or embodies) functional descriptive material (e.g. including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computer system 200 and system 100). Such interrelationships permit the data structures' functionality to be realized. Also, within such functional descriptive material, computer programs define structural and functional interrelationships between such computer programs and computer-readable medium 212 (and other aspects of computer 204, computer system 200 and system 100). Such interrelationships permit the computer programs' functionality to be realized.

For example, computer 204 reads (or accesses, or copies) such functional descriptive material from computer-readable medium 212 into the memory device of computer 204, and computer 204 performs its operations (as discussed elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as discussed elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 116 which is also a computer-readable medium (or apparatus). Moreover, the memory device of computer 204 is itself a computer-readable medium (or apparatus).

Although illustrative embodiments have been shown and described, a wide range of modifications, change and substitution is contemplated in the foregoing disclosure and in some instances, some features of the embodiment may be employed without a corresponding use of other features.

Accordingly, it is appropriate that the appended claims be construed broadly and in a manner consistent with the scope of the embodiments disclosed herein.

The invention claimed is:

1. A method performed by a computer system coupled to a network, the computer system comprising a processor and a memory for storing a set of instructions executable by the processor to perform the steps comprising:
provided a first electronic version of a paper displayable to a user at a display device coupled to the network, wherein:
the first electronic version of the paper is displayable on the display device as a likeness of the paper,
the first electronic version of the paper has been processed using a content preparation system to detect first content having a reference at a first location in the likeness,
the detected reference has been associated with a second location in the likeness,
a link has been formed in the first electronic version of the paper between the reference and the second location in the likeness such that when the first electronic version of the paper is displayed on the display device the link is embedded in the likeness, and
the link is user-selectable at the first location to cause an operation associated with the second location.

2. The method of claim 1, wherein the paper is at least one of the following: a newspaper, a magazine, a journal or a book.

3. The method of claim 1, wherein the operation further comprises providing second content displayable on the display device that is associated with the second location.

4. The method of claim 3, wherein the second content is a plain text version of at least a portion of the likeness of the paper associated with the second location.

5. The method of claim 4, wherein the likeness of the paper is displayable on the display device using a first program and the second content is displayable on the display device using a second program.

6. The method of claim 5, wherein the second location is a website and the second program is a browser.

7. The method of claim 1, wherein the operation comprises executing a script on the display device.

8. The method of claim 1, wherein a second electronic version of the paper has been obtained and translated into the first electronic version displayable as the likeness on the display device.

9. The method of claim 8, wherein the processing of the first electronic version to detect a link and the formation of the link is done during the translation of the second electronic version into the first electronic version.

10. The method of claim 1, wherein the operation comprises displaying second content retrieved from the second location in association with the likeness.

11. The method of claim 1, wherein the operation occurs external to the likeness of the paper.

12. A system coupled to a network, comprising a content delivery system having a processor and a memory storing a set of instructions executable by the processor for:
providing a first electronic version of a paper displayable to a user at a display device coupled to the network, wherein:
the first electronic version of the paper is displayable on the display device as a likeness of the paper,
the first electronic version of the paper has been processed using a content preparation system to detect first content having a reference at a first location in the likeness,
the detected reference has been associated with a second location in the likeness,
a link has been formed in the first electronic version of the paper between the reference and the second location in the likeness such that when the first electronic version of the paper is displayed on the display device the link is embedded in the likeness, and
the link is user-selectable at the first location to cause an operation associated with the second location.

13. The system of claim 12, wherein the paper is at least one of the following: a newspaper, a magazine, a journal or a book.

14. The system of claim 12, wherein the operation further comprises providing second content displayable on the display device that is associated with the second location.

15. The system of claim 14, wherein the second content is a plain text version of at least a portion of the likeness of the paper associated with the second location.

16. The system of claim 15, wherein the likeness of the paper is displayable on the display device using a first program and the second content is displayable on the display device using a second program.

17. The system of claim 16, wherein the second location is a website and the second program is a browser.

18. The system of claim 12, wherein the operation comprises executing a script on the display device.

19. The system of claim 12, wherein a second electronic version of the paper has been obtained and translated into the first electronic version displayable as the likeness on the display device.

20. The system of claim 19, wherein the processing of the first electronic version to detect a link and the formation of the link is done during the translation of the second electronic version into the first electronic version.

21. The system of claim 12, wherein the operation comprises displaying second content retrieved from the second location in association with the likeness.

22. The system of claim 12, wherein the operation occurs external to the likeness of the paper.

23. A computer system coupled to a network, the computer system comprising a processor and a tangible computer readable storage medium, comprising instructions for:
providing a first electronic version of a paper displayable to a user at a display device coupled to the network, wherein:
the first electronic version of the paper is displayable on the display device as a likeness of the paper,
the first electronic version of the paper has been processed using a content preparation system to detect first content having a reference at a first location in the likeness,
the detected reference has been associated with a second location in the likeness,
a link has been formed in the first electronic version of the paper between the reference and the second location in the likeness such that when the first electronic version of the paper is displayed on the display device the link is embedded in the likeness, and
the link is user-selectable at the first location to cause an operation associated with the second location.

24. The computer readable storage medium of claim 23, wherein the paper is at least one of the following: a newspaper, a magazine, a journal or a book.

25. The computer readable storage medium of claim 23, wherein the operation further comprises providing second content displayable on the display device that is associated with the second location.

26. The computer readable storage medium of claim 25, wherein the second content is a plain text version of at least a portion of the likeness of the paper associated with the second location.

27. The computer readable storage medium of claim 26, wherein the likeness of the paper is displayable on the display device using a first program and the second content is displayable on the display device using a second program.

28. The computer readable storage medium of claim 27, wherein the second location is a website and the second program is a browser.

29. The computer readable storage medium of claim 23, wherein the operation comprises executing a script on the display device.

30. The computer readable storage medium of claim 23, wherein a second electronic version of the paper has been obtained and translated into the first electronic version displayable as the likeness on the display device.

31. The computer readable storage medium of claim 30, wherein the processing of the first electronic version to detect a link and the formation of the link is done during the translation of the second electronic version into the first electronic version.

32. The computer readable storage medium of claim 23, wherein the operation comprises displaying second content retrieved from the second location in association with the likeness.

33. The computer readable storage medium of claim 23, wherein the operation occurs external to the likeness of the paper.

* * * * *